US012586784B2

(12) United States Patent
Ji et al.

(10) Patent No.: US 12,586,784 B2
(45) **Date of Patent: *Mar. 24, 2026**

(54) SILICON ANODES WITH WATER-SOLUBLE MALEIC ANHYDRIDE-, AND/OR MALEIC ACID-CONTAINING POLYMERS/COPOLYMERS, DERIVATIVES, AND/OR COMBINATIONS (WITH OR WITHOUT ADDITIVES) AS BINDERS

(71) Applicant: Enevate Corporation, Irvine, CA (US)

(72) Inventors: Liwen Ji, Irvine, CA (US); Younes Ansari, Irvine, CA (US); Sanjaya D. Perera, Irvine, CA (US); Benjamin Park, Irvine, CA (US)

(73) Assignee: Enevate Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/655,905

(22) Filed: May 6, 2024

(65) Prior Publication Data

US 2024/0379951 A1 Nov. 14, 2024

Related U.S. Application Data

(63) Continuation of application No. 17/398,786, filed on Aug. 10, 2021, now Pat. No. 11,978,894, which is a continuation of application No. 16/925,093, filed on Jul. 9, 2020, now Pat. No. 11,114,660.

(51) Int. Cl.

| | |
|---|---|
| ***H01M 4/38*** | (2006.01) |
| ***H01M 4/04*** | (2006.01) |
| ***H01M 4/62*** | (2006.01) |
| ***H01M 10/0525*** | (2010.01) |

(52) U.S. Cl.
CPC ......... *H01M 4/386* (2013.01); *H01M 4/0404* (2013.01); *H01M 4/622* (2013.01); *H01M 10/0525* (2013.01)

(58) Field of Classification Search
CPC .... H01M 4/386; H01M 4/0404; H01M 4/622; H01M 10/0525
See application file for complete search history.

(56) References Cited

U.S. PATENT DOCUMENTS

| | | | | |
|---|---|---|---|---|
| 11,114,660 | B1 * | 9/2021 | Ji | H01M 4/622 |
| 11,978,894 | B2 * | 5/2024 | Ji | H01M 4/625 |
| 2004/0062989 | A1 | 4/2004 | Ueno et al. | |
| 2010/0075226 | A1 | 3/2010 | Pham et al. | |

(Continued)

FOREIGN PATENT DOCUMENTS

| | | | |
|---|---|---|---|
| DE | 102016221298 | A1 | 5/2018 |
| JP | 2000251891 | A | 9/2000 |

OTHER PUBLICATIONS

Y. Jiang et al., J. Power Sources, 2016, 325, 630-636.

(Continued)

*Primary Examiner* — Ula C Ruddock
(74) *Attorney, Agent, or Firm* — McAndrews, Held & Malloy, Ltd.

(57) ABSTRACT

Systems and methods for batteries comprising a cathode, an electrolyte, and an anode, wherein the anode is a Si-dominant anode that utilizes water-soluble maleic anhydride- and/or maleic acid-containing polymers/co-polymers, derivatives, and/or combinations (with or without additives) as binders.

13 Claims, 24 Drawing Sheets

(56) References Cited

U.S. PATENT DOCUMENTS

| | | | |
|---|---|---|---|
| 2010/0097522 A1 | 4/2010 | Aoyama | |
| 2012/0094178 A1 | 4/2012 | Loveridge et al. | |
| 2013/0295454 A1 | 11/2013 | Huang et al. | |
| 2015/0340695 A1 | 11/2015 | Miki et al. | |
| 2016/0064731 A1 | 3/2016 | Jung et al. | |
| 2020/0083542 A1 | 3/2020 | Yushin et al. | |

OTHER PUBLICATIONS

H. Cho et al., J. Electrochem. Sci. Technol., 2019, 10, 131-138.
Z. Li et al., Nano Energy, 2020, 67, 104234.
International Search Report, PCT/US2021/039316 dated Jul. 21, 2021, 9 pages.
International Search Report, PCT/US2021/039316 dated Aug. 16, 2021, 9 pages.
International Preliminary Report on Patentability, PCT/US2021/039316 dated Jan. 19, 2023, 8 pages.
Y. Jiang et al., J. Power Sources, dated 2016, 325, pp. 630-636.
H. Cho et al., J. Electrochem. Sci. Technol., dated 2019, 10, pp. 131-138.
Z. Li et al., Nano Energy, dated 2020, 67, 104234.
English translation of JP-2000251891-A (Year: 2000).
Ku et al., Poly(isobutylene-alt-maleic anhydride) binders containing lithium for high-performance Li-ion batteries; Journal of Power Sources, vol. 287, 2015, p. 36-42 (Year: 2015).

* cited by examiner

SILICON ANODES WITH WATER-SOLUBLE MALEIC ANHYDRIDE-, AND/OR MALEIC ACID-CONTAINING POLYMERS/COPOLYMERS, DERIVATIVES, AND/OR COMBINATIONS (WITH OR WITHOUT ADDITIVES) AS BINDERS

CROSS-REFERENCE TO RELATED APPLICATIONS

This application is a continuation of and claims the benefit of U.S. application Ser. No. 17/398,786 filed Aug. 10, 2021, pending (now allowed), which is a continuation of and claims the benefit of U.S. application Ser. No. 16/925,093 filed Jul. 9, 2020 (now U.S. Pat. No. 11,114,660). The entirety of each of the above referenced applications is hereby incorporated by reference.

TECHNICAL FIELD

Aspects of the present disclosure relate to energy generation and storage. More specifically, certain embodiments of the disclosure relate to a method and system for using water-soluble polymers as binders for silicon anodes in Li-ion battery electrodes.

BACKGROUND

Conventional approaches for battery electrodes may cause electrode coating layers to lose contact with the electrode and/or may require toxic and/or difficult manufacturing.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for using water-soluble polymers and/or co-polymers such as those comprising maleic anhydride and/or maleic acid as binders for silicon anodes in Li-ion battery electrodes, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 1A is a simplified example battery and FIG. 1B shows realistic battery structures.

DETAILED DESCRIPTION

Figure 1A:
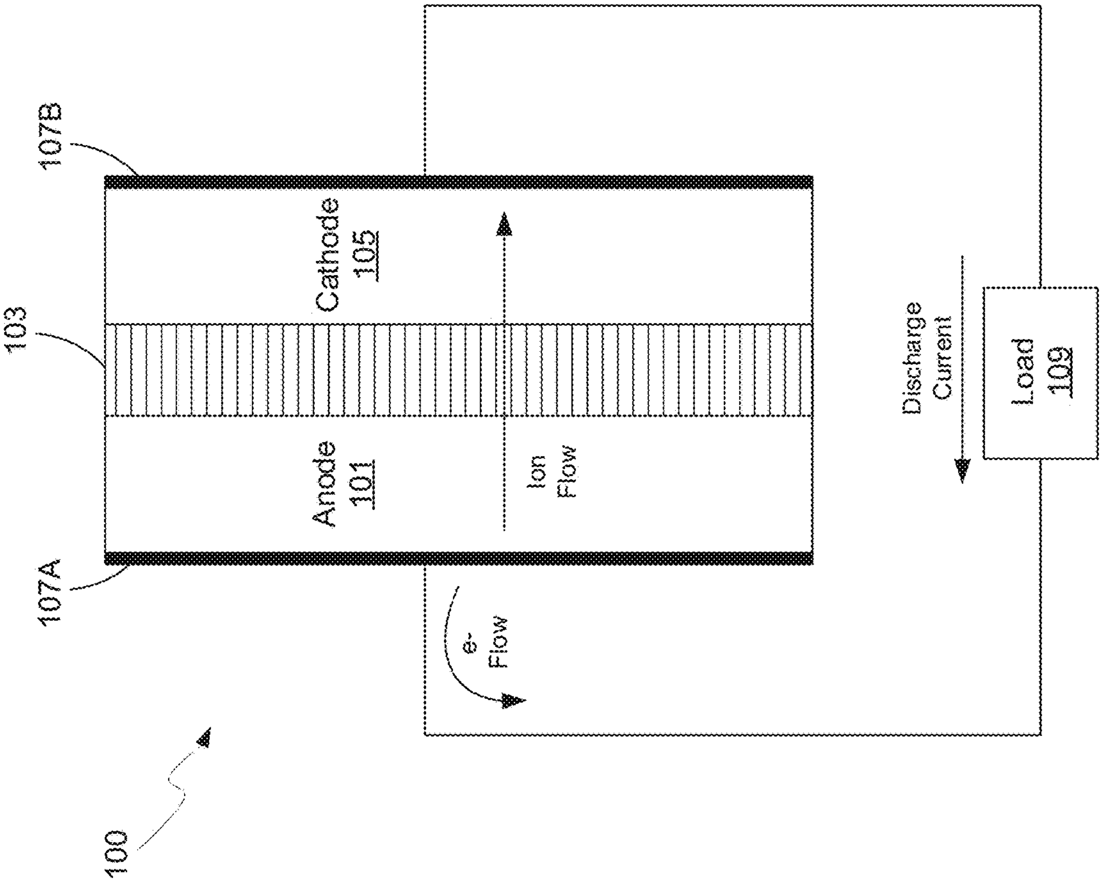
FIGS. 1A and 1B are diagrams of a battery, in accordance with an example embodiment of the disclosure.
Figure 1B:
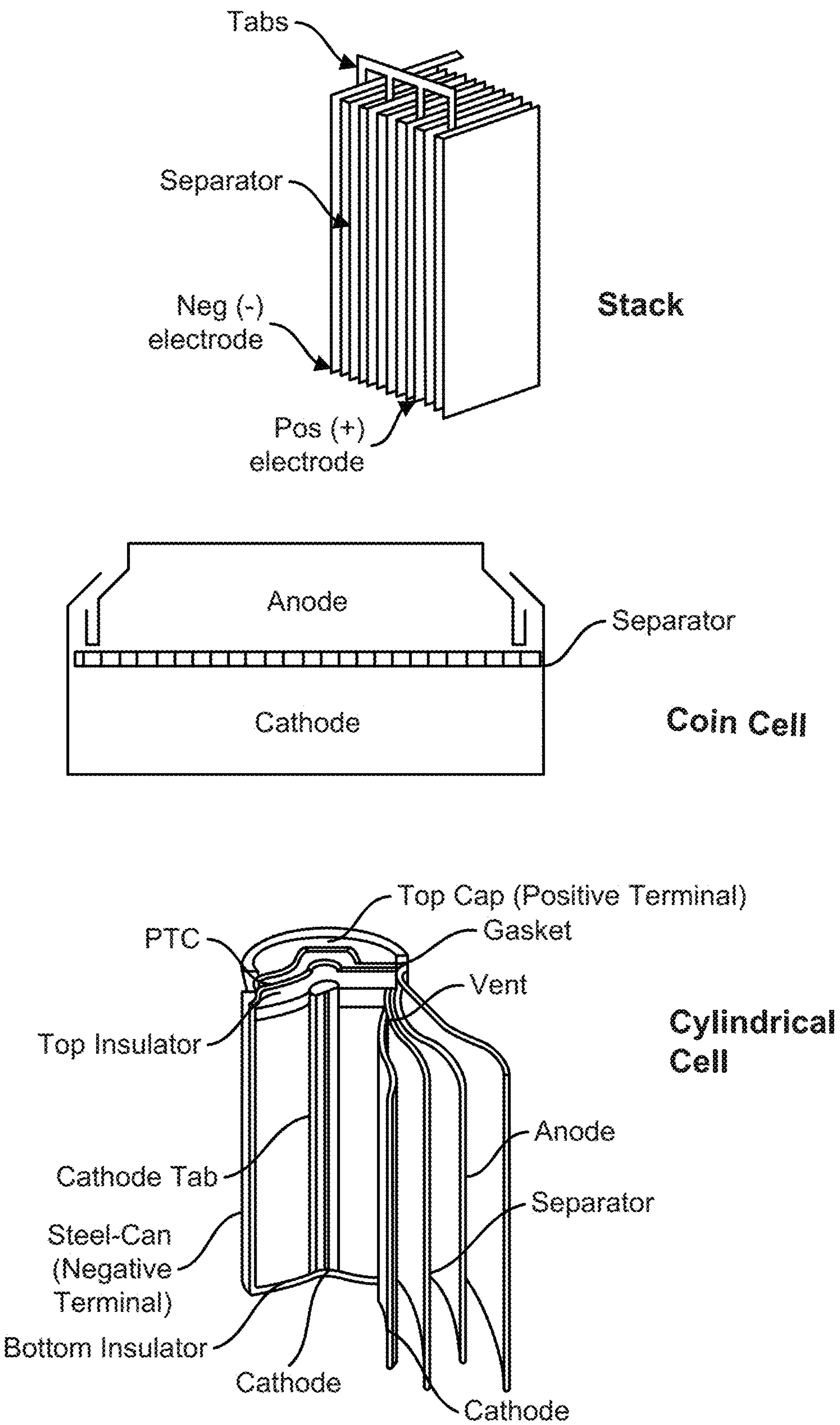

FIGS. 1A and 1B are diagrams of a battery, in accordance with an example embodiment of the disclosure. Referring to FIG. 1A, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the cell shown in FIG. 1A is a very simplified example merely to show the principle of operation of a lithium ion cell. Examples of realistic battery structures are shown in FIG. 1B, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1A illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Di-fluoroethylene carbonate (DiFEC), Propylene Carbonate (PC), Vinylene cabrboat (VC), Trifluoropropylene carbonate (TFPC), Dimethyl Carbonate (DMC), Ethyl Methyl Carbonate (EMC), Diethyl Carbonate (DEC), etc. with dissolved $LiBF_4$, $LiAsF_6$, $LiPF_6$, Lithium bis(oxalato)borate ($LiB(C_2O_4)_2$; LiBOB), Lithium difluoro(oxalato)borate ($LiBF_2(C_2O_4)$; LiDFOB), Lithium 2-trifluoromethyl-4,5-dicyanoimidazole ($C_6F_3LiN_4$; LiTDI), Lithium bis(trifluoromethanesulfonyl)imide ($LiC_2F_6NO_4S_2$; LiTFSI), Lithium bis(fluorosulfonyl)imide ($F_2LiNO_4S_2$, LiFSI), $LiPO_2F_2$, $LiSiF_6$, $LiClO_4$, Lithium triflate ($LiCF_3SO_3$), Lithium tetrafluorooxalato phosphate (LTFOP), Lithium pentafluoroethyltrifluoroborate (LiFAB), Lithium bis(2-fluoromalonato)borate (LiBFMB), Lithium 4-pyridyl trimethyl borate (LPTB), Lithium 2-fluorophenol trimethyl borate (LFPTB), Lithium catechol dimethyl borate (LiCDMB), etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

Figure 2:
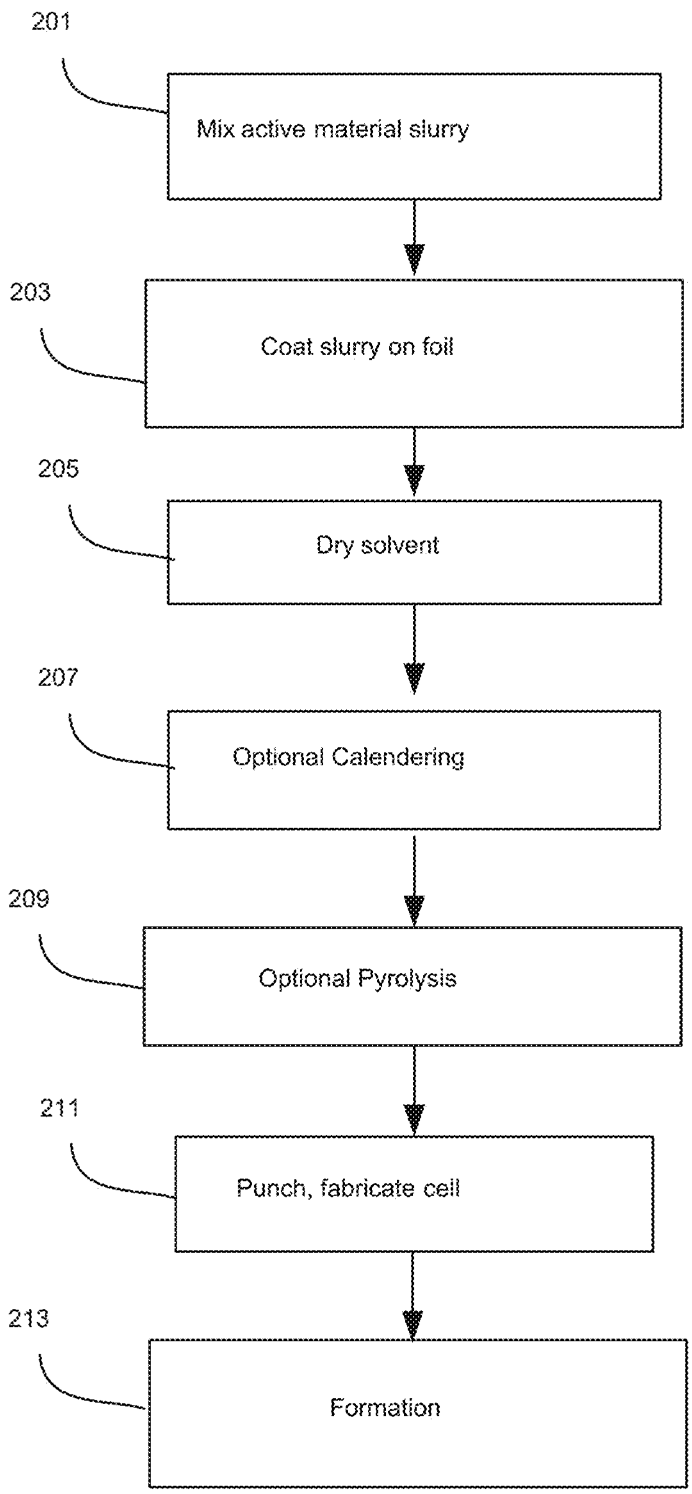
FIG. 2 is a flow diagram of a direct coating process for fabricating a cell with a silicon-dominant electrode, in accordance with an example embodiment of the disclosure.

FIG. 2 is a flow diagram of a direct coating process for fabricating a cell with a silicon-dominant electrode, in accordance with an example embodiment of the disclosure. This process comprises physically mixing the electrode coating layer with a polymer (resin) binder aqueous solution, and coating it directly on a current collector. This process is different from traditional processes of forming the electrode coating layer on a substrate and then laminating it on a current collector. This strategy may also be adopted by other anode-based cells, such as graphite, conversion type anodes, such as transition metal oxides, transition metal phosphides, and other alloy type anodes, such as Sn, Sb, Al, P, etc.

In step 201, the raw electrode coating layer may be mixed to form a slurry with stable viscosities. Changing the nature of and/or the molecular weight of the polymer binder enables the adjustment of the viscosity of the polymer and homogenization of the slurry. The fabricated anode shows good adhesion to copper and enhanced cohesion, and flexibility.

The particle size and mixing times may be varied to configure the electrode coating layer density and/or roughness. Furthermore, cathode electrode coating layers may be mixed in step 201, where the electrode coating layer may comprise lithium cobalt oxide (LCO), lithium iron phosphate, lithium nickel cobalt manganese oxide (NMC), Ni-rich lithium nickel cobalt aluminum oxide (NCA), lithium manganese oxide (LMO), lithium nickel manganese spinel, Liium phosphate (LFP), Li-rich layer-layer cathodes, $LiNi_{0.5}Mn_{1.5}O_4$(LNMO) or similar materials or combinations thereof.

In step 203, the as-prepared slurry may be coated on a copper foil, 15 μm thick in this example, and in step 205 may be dried at 130° C. in a convection oven to dry the coating and form the green anode. Similarly, cathode electrode coating layers may be coated on a foil material, such as aluminum, for example.

An optional calendering process may be utilized in step 207 where a series of hard pressure rollers may be used to finish the film/substrate into a smoother and denser sheet of material. The calendaring temperature range may be about 60° C.-180° C. Cells can be directly punched and fabricated after calendaring.

In some embodiments, the electrode coating layer may be pyrolyzed as in step 209 by heating to 500-800° C., 700° C. in this example, in an inert atmosphere such that carbon precursors are partially or completely converted into conductive carbon. The pyrolysis step may result in an anode electrode coating layer having silicon content greater than or equal to 50% by weight, where the anode has been subjected to heating at or above 400 degrees Celsius.

Pyrolysis can be done either in roll form or after punching in step 211. If done in roll form, the punching is done after the pyrolysis process. In instances where the current collector foil is not pre-punched/pre-perforated, the formed electrode may be perforated with a punching roller, for example. The punched electrodes may then be sandwiched with a separator and electrolyte to form a cell. In step 213, the cell may be subjected to a formation process, comprising initial charge and discharge steps to lithiate the anode, with some residual lithium remaining, and the cell capacity may be assessed.

As the demands for both zero-emission electric vehicles and grid-based energy storage systems increase, lower costs and improvements in energy density, power density, and safety of lithium (Li)-ion batteries are highly desirable. Enabling the high energy density and safety of Li-ion batteries requires the development of high capacity, and high-voltage cathodes and high-capacity anodes.

As discussed above, a lithium-ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces, which are then layered into stacks. The stacks are of alternating electro-chemically active materials with the separator between them.

Silicon (Si)-based electrodes for Li-ion batteries are attractive for several reasons including: (i) high theoretical capacity of about 3579 mAh/g at room temperature, which is about 10 times that of conventional graphite anodes; (ii) relatively low lithiation/delithiation potential of ~0.4V versus $Li/Li^+$; (iii) silicon is abundant and the price is low, and (iv) environmental impact of Si is low. However, the practical use of Si anodes in Li-ion batteries may be hindered by its poor performance resulting from the low intrinsic electrical conductivity and the huge volume expansion (up to 300%). The concomitant local strain during expansion pulverizes Si at the particle level and deteriorates the physical/electrical contact with both the charge carrier and current collector at the electrode level. In the meantime, the severe compression/tensile stress, upon the expansion/contraction of Li—Si alloy, ruptures the SEI layer formed at the electrode surface. Subsequently, this may cause cracks, allowing exposure to the electrolyte. As a result, the cyclability, rate capability, and Coulombic efficiency (CE) of the batteries deteriorate upon sustained cycling.

Thus, for anodes, silicon-based materials can provide significant improvement in energy density but the large volumetric expansion (>300%) during the Li alloying/dealloying processes can lead to disintegration of the active material and the loss of electrical conduction paths, thereby reducing the cycling life of the battery. In addition, an unstable solid electrolyte interphase (SEI) layer can develop on the surface of the cycled anodes, and leads to an endless exposure of Si particle surfaces to the liquid electrolyte. This results in an irreversible capacity loss at each cycle due to the reduction at the low potential where the liquid electrolyte reacts with the exposed surface of the Si anode. In addition, oxidative instability of the conventional non-aqueous electrolyte takes place at voltages beyond 4.5 V, which can lead to accelerated decay of cycling performance. Si/carbon composites may be used because carbon undergoes only small volume change during the Li insertion and dimensional stability can be preserved. However, because of the generally inferior cycle life of Si compared to graphite, only small amounts of Si or Si alloy is used in conventional anode materials. Previous studies focused on Si anodes have only shown low loading of active materials; thus they are very difficult to scale up or commercialize.

Binders are important in Li ion batteries as they promote adhesion between electrodes (e.g. electrode films) and collectors and can have an effect on the coverage of active materials. Binders hold active material particles together, acting as a connector between electrode species while adhering them to the collectors. Binders allow for greater stability and conduction in a battery. The use of binders in electrodes may increase life span and/or energy density. In a Si anode, the binder may stabilize the silicon particles.

Polyvinylidene fluoride (PVDF) is a highly non-reactive thermoplastic fluoropolymer produced by the polymerization of vinylidene difluoride and is a commonly-used binder in conventional Li-ion batteries because of its acceptable adhesion and wide electrochemical window. However, PVDF binder can only attach to Si particles via weak van der Waals force for its non-functionalized linear chain structure. Thus PVDF binder provides poor accommodation of large volume changes of Si. In addition, the toxic organic solvent N-methyl-2-pyrrolidone (NMP) has to be used when used PVDF as a binder.

In addition to the binder, the performance of Si anode is also closely related with the fabrication process of the electrode since it determines the distribution, connection, and macrostructure of the electrode layer. Optimization of the fabrication process leads to the cheaper production of electrodes with improved properties like capacity, cyclability, safety, cost, etc. There is a trade-off in the electrode design for high energy and power density. The electronic conductivity resulting from a carbon conductive additive can be brought down by the presence of a nonconductive binder. The existence of a carbon conductive additive also weakens the binding network of polymer binders. In the traditional high conductive graphite anode, the negative effect is acceptable due to the limited added amount. However, in the era of the high capacity Si anode, especially, Si-dominant anodes (>70% Si) with large volume expansion and low electronic conductivity, relatively high amounts of carbon conductive material are essential.

In the present disclosure, the use of water-soluble maleic anhydride- and/or maleic acid-containing polymers/co-polymers, derivatives, and/or combinations as binders in electrode coating layers for Si anodes is described. These polymers (resins) have unique chemical structures and functional groups which may bring the following benefits: (i) increased binding; (ii) increased conductivity; (iii) decreased cost; and/or and (iv) increased environmental safety (environmentally benign). The binders may include water-soluble polymers such as maleic anhydride-, poly maleic acid-containing polymers, derivatives, or combinations with other crosslinkers and/or additives. These polymers (resins) are amphoteric, containing —COOH, anhydride, and/or other functional groups, which makes them suitable for bonding Si powders (containing —OH groups). In addition, these water-soluble polymers (resins) can help promote the dispersion of Si active materials and conductive additives, provide good connection among them, and provide strong adhesion with metal current collectors. They are also commercially available, cheap, environmentally friendly and water-soluble, which can avoid the utilization of toxic solvents, such as NMP.

In addition, maleic anhydride- and/or maleic acid-containing polymers/co-polymers, derivatives, and/or combinations when used as binders in electrode coating layers for anodes can aid in the creation of spaces formed between Si particles during the heat treatment of the electrode, allowing for Si expansion during cycling and facilitating the penetration of the liquid electrolyte into active materials, which is helpful in promoting Li-ion transport. The present application describes further carbonizing Si anodes containing water-soluble maleic anhydride- and/or maleic acid-containing polymer (resin) binders to enhance the electrode conductivity. Carbonizing (partially or fully) the resin by pyrolysis (annealing) may result in spaces forming among Si particles as discussed above and as a result, a Si anode with a partially carbonized binder in accordance with the disclosure shows better electrochemical performance than a traditionally directly coated Si anode without annealing processes at high Si content and high current density.

Composite materials can be used as an anode in most conventional Li-ion batteries; they may also be used as the cathode in some electrochemical couples with additional additives. Composite materials described herein can be, for example, silicon composite materials, carbon composite materials, and/or silicon-carbon composite materials. In certain embodiments, the composite materials may be self-supported structures. In further embodiments, the composite materials may be self-supported monolithic structures.

Anode electrodes currently used in rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, have also been reported as viable candidates as active materials for the negative or positive electrodes. In some embodiments, a high capacity Si anode is used that is more than 70% Si.

Small particle sizes (for example, sizes in the nanometer range) generally can increase cycle life performance. They also can display very high initial irreversible capacity. However, small particle sizes also can result in very low volumetric energy density (for example, for the overall cell stack) due to the difficulty of packing the active material. Larger particle sizes, (for example, sizes in the micron range) generally can result in higher density anode material. However, the expansion of the silicon active material can result in poor cycle life due to particle cracking. For example, silicon can swell in excess of 300% upon lithium insertion. Because of this expansion, anodes including silicon need to allow expansion while maintaining electrical contact between the silicon particles. As discussed above, the use of water-soluble maleic anhydride- and/or maleic acid-containing polymers as binders as disclosed for Si anodes allows for free spaces to be created among Si particles during the pyrolysis process. These free spaces allow for the necessary expansion, creating the extra volume required for Si expansion during cycling.

In some embodiments, a largest dimension of the silicon particles can be less than about 40 μm, less than about 1 μm, between about 10 nm and about 40 μm, between about 10 nm and about 1 μm, less than about 500 nm, less than about 100 nm, and about 100 nm. All, substantially all, or at least some of the silicon particles may comprise the largest dimension described above. For example, an average or median largest dimension of the silicon particles can be less than about 40 μm, less than about 1 μm, between about 10 nm and about 40 μm, between about 10 nm and about 1 μm, less than about 500 nm, less than about 100 nm, and about 100 nm. The amount of silicon in the composite material can be greater than zero percent by weight of the mixture and composite material. In certain embodiments, the mixture comprises an amount of silicon, the amount being within a range of from about 0% to about 90% by weight, including from about 30% to about 80% by weight of the mixture. The amount of silicon in the composite material can be within a range of from about 0% to about 35% by weight, including from about 0% to about 25% by weight, from about 10% to about 35% by weight, and about 20% by weight. In further certain embodiments, the amount of silicon in the mixture is at least about 30% by weight. Additional embodiments of the amount of silicon in the composite material include more than about 50% by weight, between about 30% and about 80% by weight, between about 50% and about 70% by weight, and between about 60% and about 80% by weight. Furthermore, the silicon particles may or may not be pure silicon. For example, the silicon particles may be substantially silicon or may be a silicon alloy. In one embodiment, the silicon alloy includes silicon as the primary constituent along with one or more other elements.

As described herein, micron-sized silicon particles can provide good volumetric and gravimetric energy density combined with good cycle life. In certain embodiments, to obtain the benefits of both micron-sized silicon particles (e.g., high energy density) and nanometer-sized silicon particles (e.g., good cycle behavior), silicon particles can have an average particle size in the micron range and a surface including nanometer-sized features. In some embodiments, the silicon particles have an average particle size (e.g., average diameter or average largest dimension) between about 0.1 μm and about 30 μm or between about 0.1 μm and all values up to about 30 μm. For example, the silicon particles can have an average particle size between about 0.5 μm and about 25 μm, between about 0.5 μm and about 20 μm, between about 0.5 μm and about 15 μm, between about 0.5 μm and about 10 μm, between about 0.5 μm and about 5 μm, between about 0.5 μm and about 2 μm, between about 1 μm and about 20 μm, between about 1 μm and about 15 μm, between about 1 μm and about 10 μm, between about 5 μm and about 20 μm, etc. Thus, the average particle size can be any value between about 0.1 μm and about 30 μm, e.g., 0.1 μm, 0.5 μm, 1 μm, 5 μm, 10 μm, 15 μm, 20 μm, 25 μm, and 30 μm.

Cathode electrodes described herein may include metal oxide cathode active materials, such as one or more of: Lithium Cobalt Oxide ($LiCoO_2$) (LCO), Ni-rich oxides, high voltage cathode materials, lithium-rich oxides, nickel-rich layered oxides, lithium rich layered oxides, high-voltage spinel oxides, and high-voltage polyanionic compounds. Ni-rich oxides and/or high voltage cathode materials may include nickel cobalt aluminum oxide (NCA), nickel cobalt manganese oxide (NCM). One example of a NCM material includes $LiNi_{0.6}Co_{0.2}Mn_{0.2}O_2$ (NCM-622). Lithium rich oxides may include $xLi_2Mn_3O_2 \cdot (1-x)LiNi_aCo_bMn_cO_2$. Nickel-rich layered oxides may include $LiNi_{1+x}M_{1-x}O_2$ (where M=Co, Mn or Al). Lithium rich layered oxides may include $LiNi_{1+x}M_{1-x}O_2$ (where M=Co, Mn or Ni). High-voltage spinel oxides may include $LiNi_{0.5}Mn_{1.5}O_4$. High-voltage polyanionic compounds may include phosphates, sulfates, silicates, etc. In accordance with the disclosure, “active material” may comprise the active material alone, or may encompass an entire electrode coating layer, which includes the active material and other components.

The present application describes using water-soluble maleic anhydride- and/or poly maleic acid-containing polymers, including polymer derivatives, and/or combinations with other crosslinkers or additives as water-soluble functional binders in electrode coating layers for Si anode-based Li-ion full cells with subsequent pyrolysis processes. Polymers of varying molecular weights may be used. In some embodiments, the polymers may be co-polymers; in other embodiments the polymers may be alternating co-polymers. In some embodiments, the polymers may be alkali salts, such as sodium (Na) salts or lithium (Li) salts. In some embodiments, the polymers may be grafted polymers. In some embodiments, the polymers are linked with a crosslinker (crosslinking compound) that has two or more reactive groups thereon. In other embodiments, the polymers may include more than one of the above types combined in one polymer compound.

Polymers are created from monomers and the molecular weight (MW) of a polymer is based on the identity of the monomer and the number of monomers present in the polymer molecule. Polymer molecular weights are usually given as averages and may fall in a distribution. The MW distribution determines the properties of the polymer. In the measurement of the average MW, the two most common ways to measure are Mn, number averaged MW, and Mw, weight averaged MW (midpoint of the distribution in terms of the number of molecules). Polydispersity of a polymer (Mw:Mn ratio) describes the distribution width. Other ways to calculate MW include viscosity average molecular weight (Mv), and higher average molecular weight (Mz, Mz+1). The choice of method for polymer molecular weight determination depends on factors such as cost, experimental conditions and requirements.

In some embodiments, the polymer binder-containing Si anodes are further pyrolyzed/carbonized to enhance the electrode conductivity of the as-fabricated Si anodes. Thus presently described functional binders can enhance the adhesion and/or conductivity of a Si anode and promote the dispersion of Si active materials and conductive additive(s), while providing good connections and strong adhesion to the Cu current collector.

In some embodiments, crosslinkers may be used to crosslink the polymers, providing changes to the functionality and molecular weights and thus the properties of the polymer binder. Furthermore, in other embodiments, additives can be used along with the water-soluble maleic anhydride- and/or maleic acid-containing polymers. Additives include, but are not limited to, one or more conductive additives and/or functional compound additives such as polymers, water-soluble polymers and/or other compounds as described above. Concentrations of additives may be about 1 wt % to 100 wt % relative to the polymers as binders. In some embodiments, the concentration may be 1 wt % to 50 wt % relative to the polymer binders; in other embodiments, the concentration may be 10 wt % to 40 wt % relative to the polymer binders.

Water-soluble maleic anhydride- and/or maleic acid-containing polymers have good solubility in water with adjustable viscosity due to their unique functional polar groups. The polymers can have strong interactions with both Si powders and Cu foil, so slurries made including the binders have good quality and also have excellent adhesion with Cu foil after coating. This can contribute to the overall cycle performance improvement. In addition, these polymers have improved char yield after pyrolysis/annealing at high temperature so the prepared Si anodes can also be pyrolyzed in a temperature range that will not have a negative impact on the flexibility and other mechanical properties of the electrodes, but can help increase conductivity. Without being bound to the theory or mode of operation, it is believed that these maleic anhydride- and/or maleic acid-containing polymer binders allow for free spaces to be created among Si particles during the pyrolysis/annealing process. These free spaces can help accommodate the extra volume required for Si expansion during cycling and can facilitate the penetration of the liquid electrolyte into active materials, which is helpful in promoting Li-ion transport.

In accordance with the disclosure, maleic anhydride- and/or maleic acid-containing polymers, derivatives, and/or combinations when used as binders for anodes may have one or more of the following advantageous properties: (i) high solubility in water; (ii) increased safety; (iii) functional groups which can improve the interactions with the metal foil; (iv) easily crosslinked; (v) high carbon yield upon pyrolysis; (vi) adjustable viscosity; (vii) ease in processing; (ix) low cost and (x) environmentally friendly.

Maleic anhydride- and/or maleic acid-containing polymers/co-polymers have good solubility in water due to their polar nature; maleic acid-containing polymers are easy to dissolve into water directly and maleic anhydride-containing polymers hydrolyze and form acidic components, which are soluble. Thus these polymers are hydrophilic. In some embodiments, these polymers contain functional groups which can increase interactions resulting in good adhesion to metal foil-based current collectors. This can be important for robustness and processing. In some embodiments, the maleic anhydride- and/or maleic acid-containing polymers can be further cross-linked to adjust the viscosity of the solution and to adjust the char yields. Changes in viscosity can aid in coating and reduce the use of polymer.

As described herein and in copending U.S. case entitled "Method and System for Water Based Phenolic Binders for Silicon-Dominant Anodes," (Inventors Perera, S.; Ji, L.; Ansari, Y.; and Park, B.) the entirety of which is hereby incorporated by reference, water-soluble phenolic/resol type polymers (phenolic resins) may be created by reacting, mixing and/or crosslinking the phenolic resins with different water-soluble polymer crosslinkers or additives such as the disclosed water-soluble maleic anhydride- and/or maleic acid-containing polymers/co-polymers, derivatives, and/or combinations. As discussed above, various combinations of water-soluble polymers can be used as binders for Si anodes and/or to generate carbon to improve the Si-dominant anode/cathode full cell cycle performance. Such polymers may have a high carbon yield upon pyrolysis. As disclosed in copending U.S. case entitled "Method and System for Water Based Phenolic Binders for Silicon-Dominant Anodes," phenolic binders may be blended, crosslinked and/or derivatized to improve the water solubility and water tolerance (the highest amount of water that can be introduced before phase separation). They may also be crosslinked or co-polymerized with water-soluble polymer derivatives containing hydrophilic functional groups. The use of a water-soluble hydrophilic polymer can significantly improve the water tolerance of a phenolic resin blend compared to unmodified phenolic resins. The polymer derivatives containing hydrophilic functional groups used for crosslinking, blending or co-polymerization with phenolic resins may include anhydride and/or acid containing polymers such as the disclosed water-soluble maleic anhydride- and/or maleic acid-containing polymers/co-polymers, derivatives, and/or combinations.

As used herein, the term "alkyl" refers to a straight or branched, saturated, aliphatic radical having the number of carbon atoms indicated. The alkyl moiety may be branched or straight chain. For example, C1-C6 alkyl includes, but is not limited to, methyl, ethyl, propyl, isopropyl, butyl, isobutyl, sec-butyl, tert-butyl, pentyl, isopentyl, hexyl, etc. Other alkyl groups include, but are not limited to heptyl, octyl, nonyl, decyl, etc. Alkyl can include any number of carbons, such as 1-2, 1-3, 1-4, 1-5, 1-6, 1-7, 1-8, 1-9, 1-10, 1-11, 1-12, 1-20, 1-25, 1-30, 2-3, 2-4, 2-5, 2-6, 3-4, 3-5, 3-6, 4-5, 4-6 and 5-6. Named alkyl groups include, but are not limited to 1 carbon meth-(methyl), 2 carbons eth-(ethyl); 3 carbons-prop-(propyl), 4 carbons-but-(butyl), 5 carbon pent-(pentyl), 6 carbon hex-(hexyl), 7 carbon hept-(heptyl), 8 carbon oct-(octyl), 9 carbon non-(nonyl), 10 carbon dec-(decyl), 11 carbon undec-(undecyl), 12 carbon dodec-(dodecyl, also lauryl), 13 carbon tridec-(tridecyl), 14 carbon tetradec-(tetradecyl, also myristyl), 15 carbon pentadec-(pentadecyl), 16 carbon hexadec-(hexadecyl, cetyl), 17 carbon heptadec-(heptadecyl), 18 carbon octadec-(octadecyl, also stearyl), 19 carbon nonadec-(nonadecyl), 20 carbon eicos-(eicosyl, also arachidyl). The alkyl group is typically monovalent, but can be divalent, such as when the alkyl group links two moieties together.

The term "fluoro-alkyl" refers to an alkyl group where one, some, or all hydrogen atoms have been replaced by fluorine.

The term "alkylene" refers to an alkyl group, as defined above, linking at least two other groups, i.e., a divalent hydrocarbon radical. The two moieties linked to the alkylene can be linked to the same atom or different atoms of the alkylene. For instance, a straight chain alkylene can be the bivalent radical of $-(CH_2)_n-$, where n is 1, 2, 3, 4, 5, 6, 7, 8, 9, 10 or more. Alkylene groups include, but are not limited to, methylene, ethylene, propylene, isopropylene, butylene, isobutylene, sec-butylene, pentylene and hexylene.

The term "alkoxy" refers to alkyl group having an oxygen atom that either connects the alkoxy group to the point of attachment or is linked to two carbons of the alkoxy group. Alkoxy groups include, for example, methoxy, ethoxy, propoxy, iso-propoxy, butoxy, 2-butoxy, iso-butoxy, sec-butoxy, tert-butoxy, pentoxy, hexoxy, etc. The alkoxy groups can be further substituted with a variety of substituents described within. For example, the alkoxy groups can be substituted with halogens to form a "halo-alkoxy" group, or substituted with fluorine to form a "fluoro-alkoxy" group.

The term "alkenyl" refers to either a straight chain or branched hydrocarbon of 2 to 6 carbon atoms, having at least one double bond. Examples of alkenyl groups include, but are not limited to, vinyl, propenyl, isopropenyl, 1-butenyl, 2-butenyl, isobutenyl, butadienyl, 1-pentenyl, 2-pentenyl, isopentenyl, 1,3-pentadienyl, 1,4-pentadienyl, 1-hexenyl, 2-hexenyl, 3-hexenyl, 1,3-hexadienyl, 1,4-hexadienyl, 1,5-hexadienyl, 2,4-hexadienyl, or 1,3,5-hexatrienyl. Alkenyl groups can also have from 2 to 3, 2 to 4, 2 to 5, 3 to 4, 3 to 5, 3 to 6, 4 to 5, 4 to 6 and 5 to 6 carbons. The alkenyl group is typically monovalent, but can be divalent, such as when the alkenyl group links two moieties together.

The term "alkenylene" refers to an alkenyl group, as defined above, linking at least two other groups, i.e., a divalent hydrocarbon radical. The two moieties linked to the alkenylene can be linked to the same atom or different atoms of the alkenylene. Alkenylene groups include, but are not limited to, ethenylene, propenylene, isopropenylene, butenylene, isobutenylene, sec-butenylene, pentenylene and hexenylene.

The term "alkynyl" refers to either a straight chain or branched hydrocarbon of 2 to 6 carbon atoms, having at least one triple bond. Examples of alkynyl groups include, but are not limited to, acetylenyl, propynyl, 1-butynyl, 2-butynyl, isobutynyl, sec-butynyl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5-hexadiynyl, 2,4-hexadiynyl, or 1,3,5-hexatriynyl. Alkynyl groups can also have from 2 to 3, 2 to 4, 2 to 5, 3 to 4, 3 to 5, 3 to 6, 4 to 5, 4 to 6 and 5 to 6 carbons. The alkynyl group is typically monovalent, but can be divalent, such as when the alkynyl group links two moieties together.

The term "alkynylene" refers to an alkynyl group, as defined above, linking at least two other groups, i.e., a divalent hydrocarbon radical. The two moieties linked to the alkynylene can be linked to the same atom or different atoms of the alkynylene. Alkynylene groups include, but are not limited to, ethynylene, propynylene, butynylene, sec-butynylene, pentynylene and hexynylene.

The term "cycloalkyl" refers to a saturated or partially unsaturated, monocyclic, fused bicyclic, bridged polycyclic, or spiro ring assembly containing from 3 to 12, from 3 to 10, or from 3 to 7 ring atoms, or the number of atoms indicated. Monocyclic rings include, for example, cyclopropyl, cyclobutyl, cyclopentyl, cyclohexyl, and cyclooctyl. Bicyclic and polycyclic rings include, for example, norbornane, decahydronaphthalene and adamantane. For example, C3-C8 cycloalkyl includes cyclopropyl, cyclobutyl, cyclopentyl, cyclohexyl, cyclooctyl, and norbornane. As used herein, the term "fused" refers to two rings which have two atoms and one bond in common. For example, in the following structure, rings A and B are fused

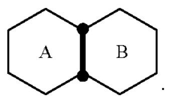

As used herein, the term "bridged polycyclic" refers to compounds wherein the cycloalkyl contains a linkage of one or more atoms connecting non-adjacent atoms. The following structures

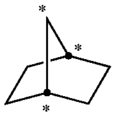

and

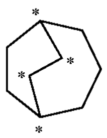

are examples of "bridged" rings. As used herein, the term "spiro" refers to two rings which have one atom in common and the two rings are not linked by a bridge. Examples of fused cycloalkyl groups are decahydronaphthalenyl, dodecahydro-1H-phenalenyl and tetradecahydroanthracenyl; examples of bridged cycloalkyl groups are bicyclo[1.1.1]pentyl, adamantanyl, and norbornanyl; and examples of spiro cycloalkyl groups include spiro[3.3]heptane and spiro[4.5]decane.

The term "cycloalkylene" refers to a cycloalkyl group, as defined above, linking at least two other groups, i.e., a divalent hydrocarbon radical. The two moieties linked to the cycloalkylene can be linked to the same atom or different atoms of the cycloalkylene. Cycloalkylene groups include, but are not limited to, cyclopropylene, cyclobutylene, cyclopentylene, cyclohexylene, and cyclooctylene.

The term "aryl" refers to a monocyclic or fused bicyclic, tricyclic or greater, aromatic ring assembly containing 6 to 16 ring carbon atoms. For example, aryl may be phenyl, benzyl or naphthyl, preferably phenyl. Aryl groups may include fused multicyclic ring assemblies wherein only one ring in the multicyclic ring assembly is aromatic. Aryl groups can be mono-, di- or tri-substituted by one, two or three radicals. Preferred as aryl is naphthyl, phenyl or phenyl mono- or disubstituted by alkoxy, phenyl, halogen, alkyl or trifluoromethyl, especially phenyl or phenyl-mono- or disubstituted by alkoxy, halogen or trifluoromethyl, and in particular phenyl.

The term "arylene" refers to an aryl group, as defined above, linking at least two other groups. The two moieties linked to the arylene are linked to different atoms of the arylene. Arylene groups include, but are not limited to, phenylene.

The term "heteroaryl" refers to a monocyclic or fused bicyclic or tricyclic aromatic ring assembly containing 5 to 16 ring atoms, where from 1 to 4 of the ring atoms are a heteroatom each N, O or S. For example, heteroaryl includes pyridyl, indolyl, indazolyl, quinoxalinyl, quinolinyl, isoquinolinyl, benzothienyl, benzofuranyl, furanyl, pyrrolyl, thiazolyl, benzothiazolyl, oxazolyl, isoxazolyl, triazolyl, tetrazolyl, pyrazolyl, imidazolyl, thienyl, or any other radicals substituted, especially mono- or di-substituted, by e.g. alkyl, nitro or halogen. Pyridyl represents 2-, 3- or 4-pyridyl, advantageously 2- or 3-pyridyl. Thienyl represents 2- or 3-thienyl. Quinolinyl represents preferably 2-, 3- or 4-quinolinyl. Isoquinolinyl represents preferably 1-, 3- or 4-isoquinolinyl. Benzopyranyl, benzothiopyranyl represents preferably 3-benzopyranyl or 3-benzothiopyranyl, respectively. Thiazolyl represents preferably 2- or 4-thiazolyl, and most preferred 4-thiazolyl. Triazolyl is preferably 1-, 2- or 5-(1,2,4-triazolyl). Tetrazolyl is preferably 5-tetrazolyl.

Preferably, heteroaryl is pyridyl, indolyl, quinolinyl, pyrrolyl, thiazolyl, isoxazolyl, triazolyl, tetrazolyl, pyrazolyl, imidazolyl, thienyl, furanyl, benzothiazolyl, benzofuranyl, isoquinolinyl, benzothienyl, oxazolyl, indazolyl, or any of the radicals substituted, especially mono- or di-substituted.

The term "heteroalkyl" refers to an alkyl group having from 1 to 3 heteroatoms such as N, O and S. The heteroatoms can also be oxidized, such as, but not limited to, —S(O)— and —$S(O)_2$—. For example, heteroalkyl can include ethers, thioethers, alkyl-amines and alkyl-thiols.

The term "heteroalkylene" refers to a heteroalkyl group, as defined above, linking at least two other groups. The two moieties linked to the heteroalkylene can be linked to the same atom or different atoms of the heteroalkylene.

The term "heterocycloalkyl" refers to a ring system having from 3 ring members to about 20 ring members and from 1 to about 5 heteroatoms such as N, O and S. The heteroatoms can also be oxidized, such as, but not limited to, —S(O)— and —$S(O)_2$—. For example, heterocycle includes, but is not limited to, tetrahydrofuranyl, tetrahydrothiophenyl, morpholino, pyrrolidinyl, pyrrolinyl, imidazolidinyl, imidazolinyl, pyrazolidinyl, pyrazolinyl, piperazinyl, piperidinyl, indolinyl, quinuclidinyl and 1,4-dioxa-8-aza-spiro[4.5]dec-8-yl.

The term "heterocycloalkylene" refers to a heterocyclalkyl group, as defined above, linking at least two other groups. The two moieties linked to the heterocycloalkylene can be linked to the same atom or different atoms of the heterocycloalkylene.

The term "optionally substituted" is used herein to indicate a moiety that can be unsubstituted or substituted by one or more substituent. When a moiety term is used without specifically indicating as substituted, the moiety is unsubstituted.

In accordance with the disclosure, maleic anhydride- and/or maleic acid-containing polymers/co-polymers may be in alkali salt form. Alkali salts are those salts having an alkali metal counterion. The alkali metals are those in Group 1 of the Periodic Table, specifically, lithium (Li), sodium (Na), potassium (K), rubidium (Rb), cesium (Cs), and francium (Fr). Group 1 also includes hydrogen (H). In salts, these alkali metals appear as alkali metal ions (such as $Na^+$). In some embodiments, the salt is a sodium salt. In other embodiments, the salt is a lithium salt.

In accordance with the disclosure, water-soluble maleic anhydride-containing polymers, including alternating co-polymers such as Poly(methyl vinyl ether-alt-maleic anhydride) (PMVMA) may be used as binders for Si dominant anodes. In some embodiments, the polymer has different molecular weights or is further derivatized. A general Poly (methyl vinyl ether-alt-maleic anhydride) (PMVMA) structure (I) is shown below:

(I)

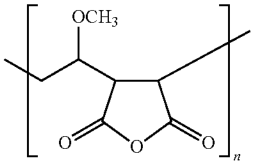

In some embodiments, n may be >10; in other embodiments, n may be >100, >1,000, >10,000 or >100,000.

In other embodiments, water-soluble maleic anhydride-containing polymers, including alternating co-polymers such as Poly(alkyl vinyl ether-alt-maleic anhydride) may be used as binders for Si dominant anodes. In some embodiments, the polymer has different molecular weights or is further derivatized. A general Poly(alkyl vinyl ether-alt-maleic anhydride) structure (Ia) is shown below:

(Ia)

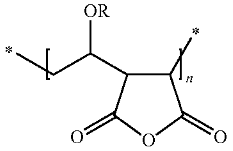

In some embodiments, n may be >10; in other embodiments, n may be >100, >1,000, >10,000 or >100,000. In some embodiments, R may be H or alkyl as defined above. In other embodiments, R may be selected from the group consisting of H, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as defined above, which may be also optionally substituted.

In accordance with the disclosure, water-soluble maleic acid-containing polymers such as Poly(methyl vinyl ether-alt-maleic acid) may be used as binders for Si dominant anodes. In some embodiments, the polymer has different molecular weights or is further derivatized. A general Poly (methyl vinyl ether-alt-maleic acid) structure (II) is shown below:

(II)

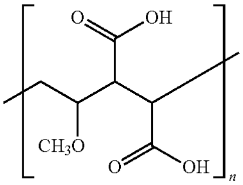

In some embodiments, n may be >10; in other embodiments, n may be >100, >1,000, >10,000 or >100,000.

In other embodiments, water-soluble maleic acid-containing polymers such as Poly(alkyl vinyl ether-alt-maleic acid) may be used as binders for Si dominant anodes. In some embodiments, the polymer has different molecular weights or is further derivatized. A general Poly(alkyl vinyl ether-alt-maleic acid) structure (IIa) is shown below:

(IIa)

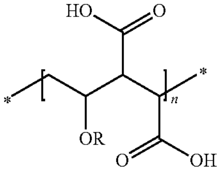

In some embodiments, n may be >10; in other embodiments, n may be >100, >1,000, >10,000 or >100,000. In some embodiments, R may be H or alkyl as defined above. In other embodiments, R may be selected from the group consisting of H, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as defined above, which may be also optionally substituted.

In accordance with the disclosure, water-soluble maleic acid-containing co-polymers such as Poly(acrylic acid-co-maleic acid) may be used as binders for Si dominant anodes. In some embodiments, the polymer has different molecular weights or is further derivatized. A general Poly(acrylic acid-co-maleic acid) structure (III) is shown below:

(III)

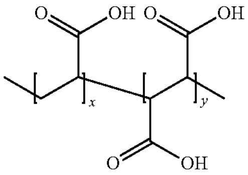

In some embodiments, x and/or y may be >10; in other embodiments, x and/or y may be >100, >1,000, >10,000 or >100,000.

In accordance with the disclosure, salts of water-soluble maleic acid-containing co-polymers such as Poly(acrylic acid-co-maleic acid) sodium salt may be used as binders for Si dominant anodes. In some embodiments, the polymer has different molecular weights or is further derivatized. A general Poly(acrylic acid-co-maleic acid) salt structure (IV) is shown below:

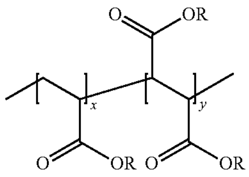

In some embodiments, x and/or y may be >10; in other embodiments, x and/or y may be >100, >1,000, >10,000 or >100,000. In some embodiments, each R may be the same or different and may be H or an alkali metal ion such as sodium (Na), as defined above. In other embodiments, each R may be the same or different and may be selected from the group consisting of an alkali metal ion, H, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as defined above, which may be also optionally substituted.

In accordance with the disclosure, salts of water-soluble maleic acid-containing alternating co-polymers such as Poly (styrene-alt-maleic acid) sodium salt may be used as binders for Si dominant anodes. In some embodiments, the polymer has different molecular weights or is further derivatized. A general Poly(styrene-alt-maleic acid) salt structure (V) is shown below:

(V)

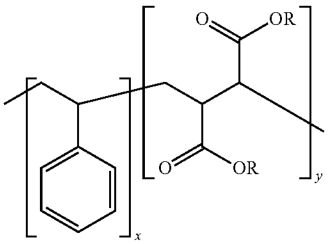

In some embodiments, x and/or y may be >10; in other embodiments, x and/or y may be >100, >1,000, >10,000 or >100,000. In some embodiments, each R may be the same or different and may be H or an alkali metal ion such as sodium (Na), as defined above. In other embodiments, each R may be the same or different and may be selected from the group consisting of an alkali metal ion, H, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as defined above, which may be also optionally substituted.

In accordance with the disclosure, water-soluble maleic acid-containing alternating co-polymers such as Poly(styrene-co-maleic acid), which may be partially or fully esterified (e.g. isobutyl ester, methyl ester and/or combinations thereof) may be used as binders for Si dominant anodes. In some embodiments, the polymer has different molecular weights or is further derivatized. A general Poly(styrene-co-maleic acid) structure (VI) is shown below:

(VI)

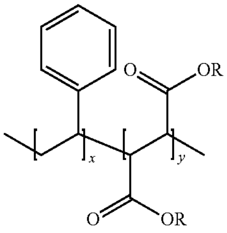

In some embodiments, x and/or y may be >10; in other embodiments, x and/or y may be >100, >1,000, >10,000 or >100,000. In some embodiments, each R may be the same or different and may be H or alkyl, as defined above. In other embodiments, each R may be the same or different and may be H or $CH_3$ or

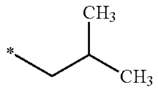

or

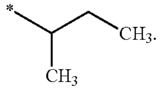

In further embodiments, each R may be the same or different and may be selected from the group consisting of H, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as defined above, which may be also optionally substituted.

In accordance with the disclosure, water-soluble maleic anhydride-containing alternating co-polymers such as Poly (styrene-alt-maleic anhydride) may be used as binders for Si dominant anodes. In some embodiments, the polymer has different molecular weights or is further derivatized. A general Poly(styrene-alt-maleic anhydride) structure (VII) is shown below:

(VII)

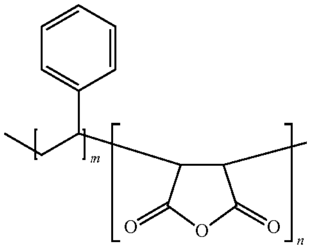

In some embodiments, m and/or n may be >10; in other embodiments, m and/or n may be >100, >1,000, >10,000 or >100,000.

In accordance with the disclosure, water-soluble maleic anhydride-containing alternating co-polymers such as Poly (alkylene-alt-maleic anhydride) may be used as binders for Si dominant anodes. In some embodiments, the polymer has different molecular weights or is further derivatized. A general Poly(alkylene-alt-maleic anhydride) structure (VII) is shown below:

(VIII)

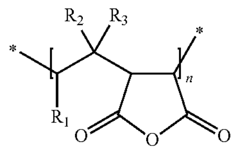

In some embodiments, n may be >10; in other embodiments, n may be >100, >1,000, >10,000 or >100,000. In some embodiments, each $R_1$, $R_2$ and $R_3$ may be the same or different and may be H or alkyl as defined above. In some embodiments, $R_1$=$CH_2(CH_2)_xCH_3$, where x=1-20. In certain embodiments, the water-soluble maleic anhydride-containing alternating co-polymer may be Poly(isobutylene-alt-maleic anhydride) {$R_1$=H, $R_2$ and $R_3$=$CH_3$}; Poly(maleic anhydride-alt-1-octadecene) {$R_1$=octadecane/octadecene (i.e. C18 chain), $R_2$ and $R_3$=H}; or Poly(ethylene-alt-maleic anhydride) {$R_1$, $R_2$ and $R_3$=H}. In further embodiments, each $R_1$, $R_2$ and $R_3$ may be the same or different and may be selected from the group consisting of H, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as defined above, which may be also optionally substituted.

In accordance with the disclosure, water-soluble maleic anhydride-containing grafted polymers such as water-soluble Polyalkylene-graft-maleic anhydride may be used as binders for Si dominant anodes. In some embodiments, the polymer has different molecular weights or is further derivatized. A general Polyalkylene-graft-maleic anhydride structure (IX) is shown below:

(IX)

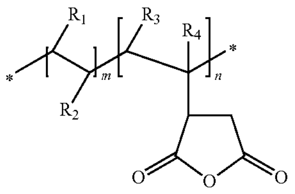

In some embodiments, m and/or n may be >10; in other embodiments, m and/or n may be >100, >1,000, >10,000 or >100,000. In some embodiments, each $R_1$, $R_2$, $R_3$ and $R_4$ may be the same or different and may be H or alkyl as defined above. In certain embodiments, the water-soluble Polyalkylene-graft-maleic anhydride may be Polyethylene-graft-maleic anhydride {$R_1$, $R_2$, $R_3$ and $R_4$=H} or Polypropylene-graft-maleic anhydride {$R_1$=H, $R_2$=$CH_3$, $R_3$=H and $R_4$=$CH_3$}. In further embodiments, each $R_1$, $R_2$, $R_3$ and $R_4$ may be the same or different and may be selected from the group consisting of H, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as defined above, which may be also optionally substituted.

In accordance with the disclosure, water-soluble maleic anhydride-containing grafted/block polymers such as water-soluble Polyalkene-graft-maleic anhydride may be used as binders for Si dominant anodes. In some embodiments, the polymer has different molecular weights or is further derivatized. A general Polyalkene-graft-maleic anhydride (X) is shown below:

(X)

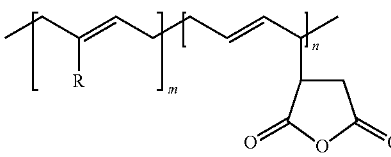

In some embodiments, m and/or n may be >10; in other embodiments, m and/or n may be >100, >1,000, >10,000 or >100,000. In some embodiments, R may be H or alkyl, as defined above. In certain embodiments, the water-soluble Polyalkene-graft-maleic anhydride may be Polyisoprene-graft-maleic anhydride {R=$CH_3$}. In other embodiments, R may be selected from the group consisting of H, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as defined above, which may be also optionally substituted.

In accordance with the disclosure, water-soluble maleic anhydride-containing grafted/block polymers such as water-soluble Polystyrene-block-poly(alkylene-ran-butylene)-block-polystyrene-graft-maleic anhydride may be used as binders for Si dominant anodes. In some embodiments, the polymer has different molecular weights or is further derivatized. A general Polystyrene-block-poly(alkylene-ran-butylene)-block-polystyrene-graft-maleic anhydride structure (XI) is shown below:

(XI)

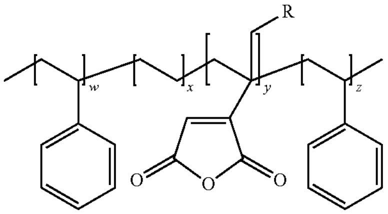

In some embodiments, w, x, y and/or z may be >10; in other embodiments, w, x, y and/or z may be >100, >1,000, >10,000 or >100,000. In some embodiments, R may be H or alkyl, as defined above. In certain embodiments, the water-soluble maleic anhydride-containing alternating co-polymer may be Polystyrene-block-poly(ethylene-ran-butylene)-block-polystyrene-graft-maleic anhydride {R=$CH_3$}. In other embodiments, R may be selected from the group consisting of H, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as defined above, which may be also optionally substituted.

Further functional compounds may be used as cross-linkers or additives to the above-described water-soluble maleic anhydride- and/or maleic acid-containing polymer binder compositions. In some embodiments, compositions containing the various components are utilized; in other embodiments, the further functional compounds may serve as a crosslinkers and/or be copolymerized with the water-soluble maleic anhydride- and/or maleic acid-containing polymer. In some embodiments, functional compounds may be used to crosslink the polymers, providing changes to the functionality and molecular weights and thus the properties of the polymer binder. The crosslinkers or additives may be used in different concentrations such as 1% to 100% relative to the polymer binders for various types of Si anodes. Concentrations of additives may be about 1 wt % to 100 wt % relative to the polymers as binders. In some embodiments, the concentration may be 1 wt % to 50 wt % relative to the polymer binders; in other embodiments, the concentration may be 10 wt % to 40 wt % relative to the polymer binders. In other embodiments, the concentration may be 1 wt % to 20 wt % relative to the polymer binders. In other embodiments, the concentration may be 1 wt % to 10 wt % relative to the polymer binders In further embodiments, the concentration may be 1 wt % to 5 wt % relative to the polymer binders.

Additives include, but are not limited to, one or more functional compound additives such as polymers, water-soluble polymers, cyclodextrin-based compounds, tannic acid (and/or other polyphenols), nitrogen-containing compounds and sulfur-containing compounds; and/or conductive additives; as described below.

In some embodiments, further functional compounds used with the water-soluble maleic anhydride- and/or maleic acid-containing polymer binders include functional Cyclodextrin-based compounds (including different types of functional α-Cyclodextrin, β-Cyclodextrin, β-Cyclodextrin compounds, etc.). The functional cyclodextrin-based compounds may be used as crosslinkers to further improve the viscosity of the maleic anhydride- and/or maleic acid-containing polymer binder solution and/or to enhance the interactions of the polymers with Si powders.

In some embodiments, further functional compounds that may be used as crosslinkers or additives are functional aliphatic and aromatic nitrogen-containing compounds including primary amines ($R'NH_2$), secondary amines (R'R"NH), secondary heterocyclic amines and/or imines or amides. In some embodiments, the compound is selected from Putrescine, Spermidine, Spermine, Thermospermine, Polyethylenimine (PEI), N,N'-Methylenebisacrylamide (MBAA), or N,N'-Ethylenebisacrylamide (EBAA), as shown below. These nitrogen-containing compounds include, but are not limited to, the following:

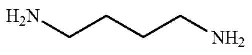

Putrescine

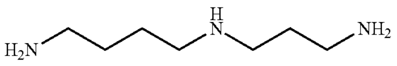

Spermidine

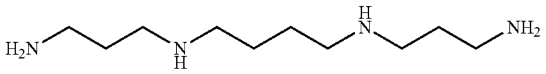

Spermine

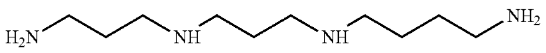

Thermospermine

-continued

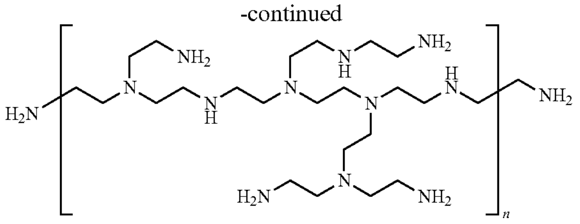

Polyethylenimine (PEI)
Molecular weight may be 5,000-20,000
In some embodiments, molecular weight may be 10,000

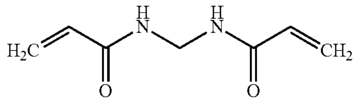

N,N'-Methylenebisacrylamide (MBAA)

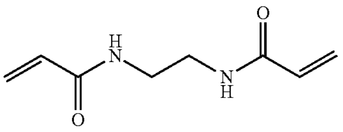

N,N'-Ethylenebisacrylamide (EBAA)

In some embodiments, further functional compounds that may be used as crosslinkers or additives are polyphenol compounds including, but not limited to Tannic acid.

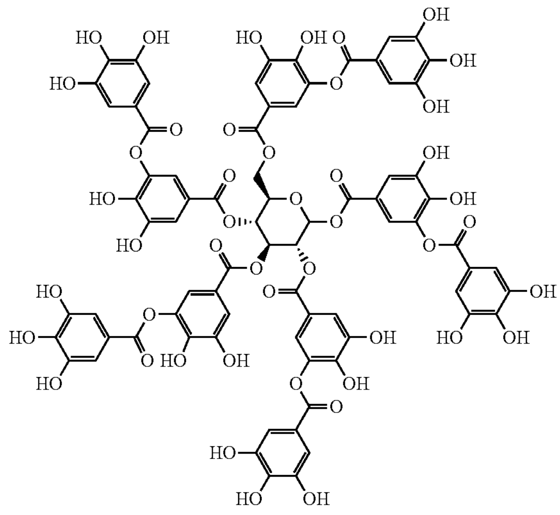

Tannic Acid

Other polyphenols may also be used such as flavonoids (e.g. quercetin, kaempferol, catechins, anthocyanins), phenolic acids (e.g. stilbenes, lignans), polyphenolic amides (e.g. capsaicinoids, avenanthramides), resveratrol, ellagic acid, curcumin and lignans.

In some embodiments, further functional compounds that may be used as crosslinkers or additives are functional aliphatic and aromatic epoxy compounds. In some embodiments, the compound is selected from Poly(ethylene glycol) diglycidyl ether, Trimethylolpropane triglycidyl ether, Tris (4-hydroxyphenyl)methane triglycidyl ether, Tris(2,3-epoxypropyl) isocyanurate, or Poly[(o-cresyl glycidyl ether)-co-formaldehyde], as shown below. These epoxy compounds include, but are not limited to, the following:

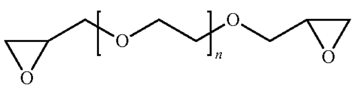

Poly(ethylene glycol) diglycidyl ether
Molecular weight may be 100-1,000
In some embodiments, molecular weight may be 250-500

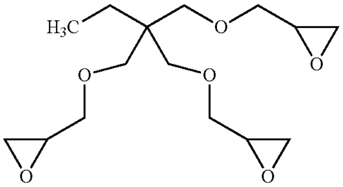

Trimethylolpropane triglycidyl ether

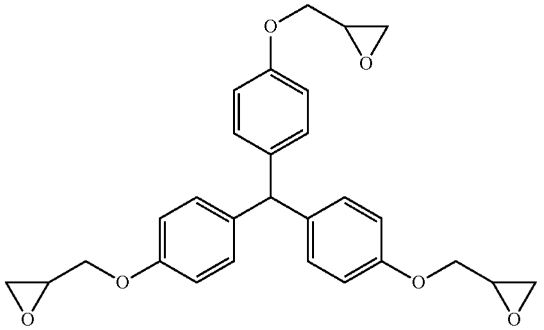

Tris(4-hydroxyphenyl)methane triglycidyl ether

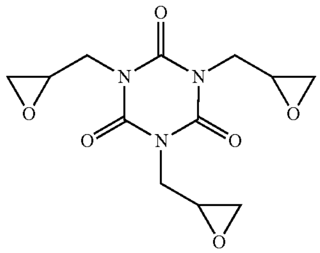

Tris(2,3-epoxypropyl) isocyanurate

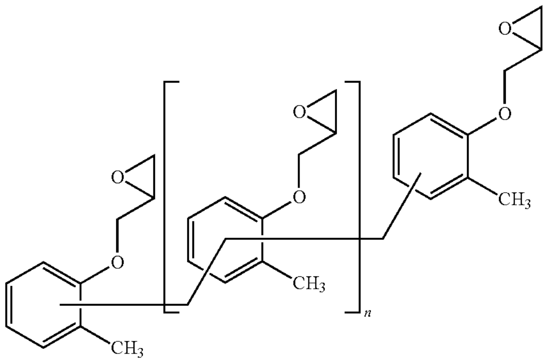

Poly[(o-cresyl glycidyl ether)-co-formaldehyde (n>10)

In some embodiments, further functional compounds that may be used as crosslinkers or additives are functional sulfur-containing compounds. In some embodiments, the compound is selected from Trimethylolpropane tris(3-mercaptopropionate), Pentaerythritol tetrakis(3-mercaptopropionate), 2,2'-(Ethylenedioxy)diethanethiol, 1,2-Ethanedithiol, 1,4-Butanedithiol, as shown below. These sulfur-containing compounds include, but are not limited to, the following:

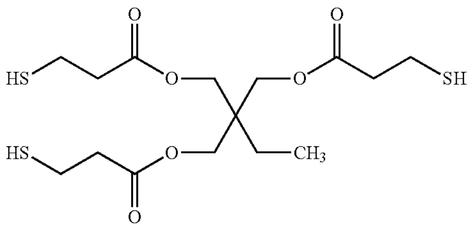

Trimethylolpropane tris(3-mercaptopropionate)

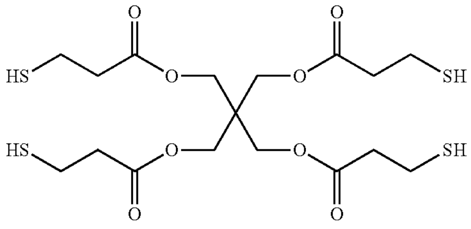

Pentaerythritol tetrakis(3-mercaptopropionate)

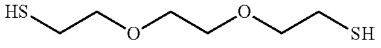

2,2'-(Ethylenedioxy)diethanethiol $HSCH_2CH_2SH$ $HSCH_2CH_2CH_2CH_2SH$ 1,2-Ethanedithiol 1,4-Butanedithiol In some embodiments, the additives can be used along with the water-soluble maleic anhydride- and/or maleic acid-containing polymers in the creation of the electrode. Additives include, but are not limited to, one or more conductive additives and/or functional compound additives such as polymers, water-soluble polymers, cyclodextrin-based compounds, tannic acid, nitrogen-containing compounds and sulfur-containing compounds, and/or other compounds, as described herein. Concentrations of additives may be about 1 wt % to 100 wt % relative to the polymers as binders. In some embodiments, the concentration may be 1 wt % to 50 wt % relative to the polymer binders; in other embodiments, the concentration may be 10 wt % to 40 wt % relative to the polymer binders. In other embodiments, the concentration may be 1 wt % to 20 wt % relative to the polymer binders. In other embodiments, the concentration may be 1 wt % to 10 wt % relative to the polymer binders In further embodiments, the concentration may be 1 wt % to 5 wt % relative to the polymer binders. One or more additives can be used. In some embodiments, a conductive additive and a functional compound additive are used together with the water-soluble maleic anhydride- and/or maleic acid-containing polymer/co-polymer.

In some embodiments, conductive additives, such as Super P carbon black, graphite, graphene, carbon nanofibers, carbon fibers, carbon nanotubes, porous carbons and other types of zero-, one-, two-, three-dimensional carbon materials can be added into all of the aforementioned systems as conductive additives for different types of Si anodes. The presently described functional binders can promote the dispersion of Si active materials and conductive additive(s), while providing good connections and strong adhesion to metal current collectors. Concentrations of additives may be about 1 wt % to 100 wt % relative to the polymers as binders. In some embodiments, the concentration may be 1 wt % to 50 wt % relative to the polymer binders; in other embodiments, the concentration may be 10 wt % to 40 wt % relative to the polymer binders. In other embodiments, the concentration may be 1 wt % to 20 wt % relative to the polymer binders. In other embodiments, the concentration may be 1 wt % to 10 wt % relative to the polymer binders In further embodiments, the concentration may be 1 wt % to 5 wt % relative to the polymer binders.

In some embodiments, further functional compound additives such as polymers can be used in combination with the water-soluble maleic anhydride- and/or maleic acid-containing polymer binders for Si dominant anodes. Functional compound additive polymers include, but are not limited to, other water-soluble polymers, such as Poly(acrylic acid) (PAA), Poly(vinyl alcohol) (PVA or PVOH), Lignin, styrene-butadiene rubber (SBR), Gelatin, Carboxymethyl cellulose (CMC), Chitosan, Alginate, Pectin, Amylose, Starch, Gums (Xanthan, Arabic, Gelan, Karaya, Guar). In further embodiments, other functional compound additive polymers such as phenolic/resol type polymers (phenolic resins) can be made water-soluble by using in combination with the water-soluble maleic anhydride- and/or maleic acid-containing polymers disclosed herein (such as by crosslinking the compounds). Concentrations of additives may be about 1 wt % to 100 wt % relative to the polymers as binders. In some embodiments, the concentration may be 1 wt % to 50 wt % relative to the polymer binders; in other embodiments, the concentration may be 10 wt % to 40 wt % relative to the polymer binders. In other embodiments, the concentration may be 1 wt % to 20 wt % relative to the polymer binders. In other embodiments, the concentration may be 1 wt % to 10 wt % relative to the polymer binders. In further embodiments, the concentration may be 1 wt % to 5 wt % relative to the polymer binders.

In accordance with the disclosure, water-soluble maleic anhydride- and/or maleic acid-containing polymers/co-polymers, derivatives, and/or combinations are used as binders for Si anodes to improve the Si-dominant anode/cathode full cell cycle performance. These water-soluble maleic anhydride- and/or maleic acid-containing polymers/co-polymers, derivatives, and/or combinations include, but are not limited to Poly(methyl vinyl ether-alt-maleic anhydride); Poly(methyl vinyl ether-alt-maleic acid); Poly(acrylic acid-co-maleic acid); Poly(acrylic acid-co-maleic acid) sodium salts; Poly(styrene-alt-maleic acid) sodium salts; Poly(styrene-co-maleic acid), partial isobutyl esters; Poly(styrene-co-maleic acid), partial isobutyl/methyl mixed esters; Poly(styrene-alt-maleic anhydride), partial methyl esters; Poly(isobutylene-alt-maleic anhydride); Poly(maleic anhydride-alt-1-octadecene); Poly(ethylene-alt-maleic anhydride); Polyethylene-graft-maleic anhydride; Polypropylene-graft-maleic anhydride; Polyisoprene-graft-maleic anhydride; and/or Polystyrene-block-poly(ethylene-ran-butylene)-block-polystyrene-graft-maleic anhydride. Polymers may have varying molecular weights. These polymers may be fully or partially carbonized (pyrolyzed).

Water-soluble maleic anhydride- and/or maleic acid-containing polymers/co-polymers, derivatives, and/or combinations are used as binders for various anodes such as anode-based Li-ion batteries, including Si anode-based and directly coated Si-dominant anodes. In a further embodiment, the binders may be used to treat graphite (carbon) anode-based Li-ion batteries, including hard/soft carbon. In another embodiment, the binders may be used to treat other anode-based Li-ion batteries. These anodes may be Sn, Sb, P, transition metal oxides, etc. In some embodiments, the anode comprises an active material that comprises between 50% to 95% silicon. In some embodiments, the active material comprises more than 70% Si.

In some embodiments, electrodes may be made by adding the water-soluble maleic anhydride- and/or maleic acid-containing polymer binders, as described above, along with any additives, into the electrode slurry or depositing on an electrode active material (i.e., electrode coating layer) when creating the additive-containing electrodes. Aqueous solutions of the polymer binders are prepared, which are used to create the slurry, which then may be used for coating the electrode. In some embodiments, the above procedure is used to make Si anode-based or directly coated Si-dominant anodes, etc. having a water-soluble maleic anhydride- and/or maleic acid-containing polymer binder.

In some embodiments, the polymer binder-containing Si anode materials as described above may be carbonized through pyrolysis of the polymer. A carbon network may be formed via carbonization of the binders through a heat treatment of the electrode (pyrolysis). This network enhances the electrode conductivity and mechanical properties of the as-fabricated Si anodes. Pyrolysis may be full or partial. Carbonized polymers can serve as both a binder and a conductive additive and show less aggregation compared to conventional carbon conductive additives. Pyrolysis may be carried out by heating to 500-1200° C. In some embodiments, pyrolysis may be carried out by heating to 500-800° C.

The below example devices and processes for device fabrication generally described below, and the performances of lithium ion batteries with different water-soluble maleic anhydride- and/or maleic acid-containing polymer binders are evaluated.

Figure 3:
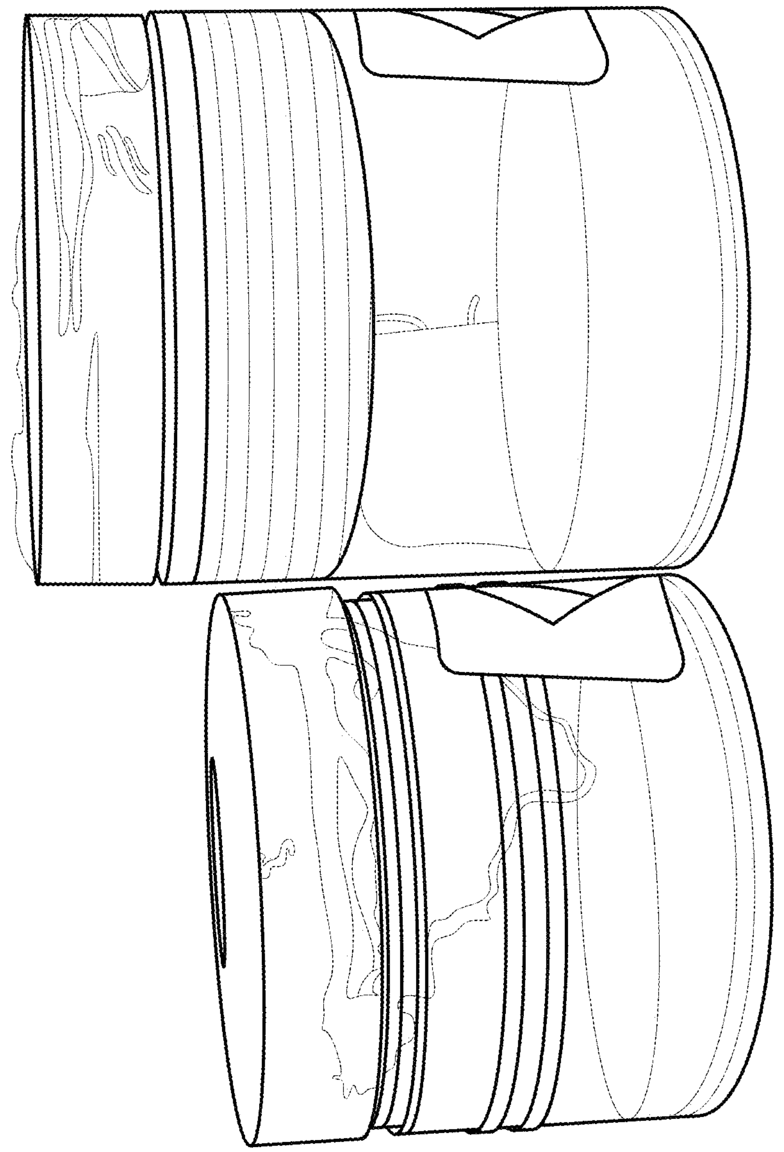
FIG. 3 is a photo of 20 wt % Poly(methyl vinyl ether-alt-maleic anhydride) (PMVMA) aqueous solution, in accordance with an example embodiment of the disclosure.

Aqueous solutions of water-soluble maleic anhydride- and/or maleic acid-containing polymers (with or without further additives) may be made at varying concentrations. Concentrations may be about 1 wt % to 90 wt %. In some embodiments, the concentration may be 1 wt % to 50 wt % in deionized (DI) water; in other embodiments, the concentration may be 10 wt % to 40 wt %; in further embodiments, the concentration may be 10 wt % to 30 wt %. In one embodiment; Poly(methyl vinyl ether-alt-maleic anhydride) (PMVMA) may be made into a 20 wt % aqueous solution in DI water, as shown in FIG. 3. In the present disclosure, water-soluble maleic anhydride- and/or maleic acid-containing polymers such as PMVMA have very good dissolution in water due to the existence of polar groups in their molecular structures which can have strong interactions with $H_2O$ molecules.

Figure 4:
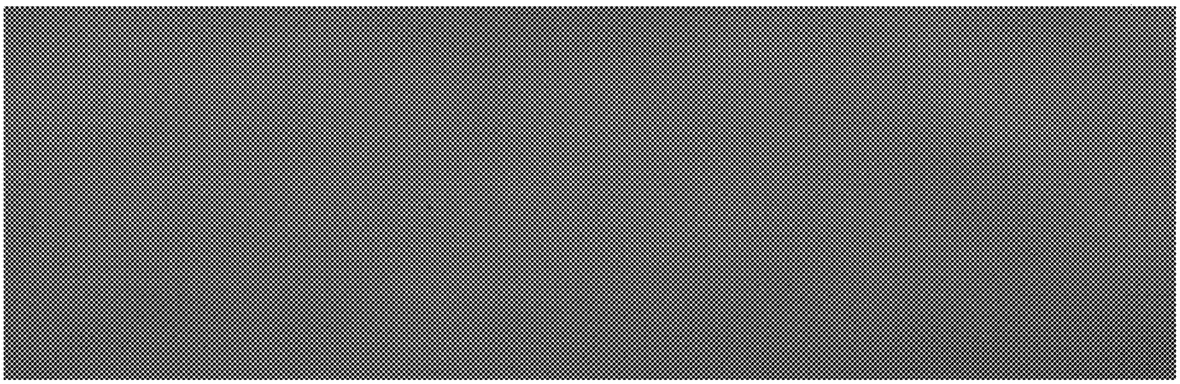
FIG. 4 is a photo of a direct coated Si anode with 20 wt % Poly(methyl vinyl ether-alt-maleic anhydride) (PMVMA) aqueous solution as binder, in accordance with an example embodiment of the disclosure.

In accordance with the disclosure, electrodes using the binders as disclosed herein show less aggregation as compared to conventional carbon conductive additives. Electrodes may be made by adding the water-soluble maleic anhydride- and/or maleic acid-containing polymer binders, as described above, along with any additives, into the electrode slurry. A photo of a direct coated Si anode using a 20 wt % Poly(methyl vinyl ether-alt-maleic anhydride) (PMVMA) aqueous solution as binder is shown in FIG. 4. The photo indicates that the Si powders can be homogeneously dispersed into the polymer phase and there are no clear Si agglomerates or clusters.

Figure 5:
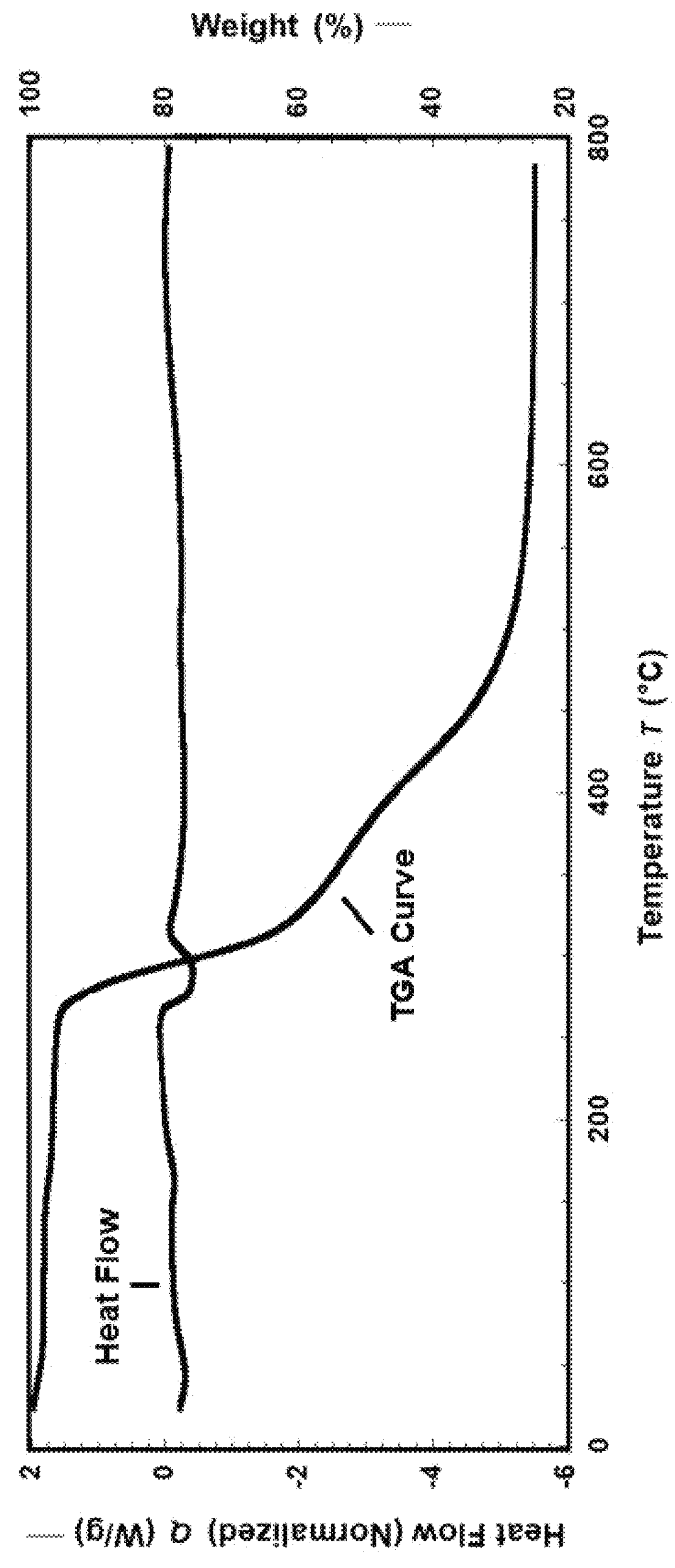
FIG. 5 shows TGA curves of Poly(methyl vinyl ether-alt-maleic anhydride) (PMVMA) under Argon, in accordance with an example embodiment of the disclosure.

In some embodiments, the polymer binder-containing Si anodes may be further carbonized through pyrolysis of the polymer to form a carbon network. FIG. 5 shows Thermogravimetric Analysis (TGA) curves of Poly(methyl vinyl ether-alt-maleic anhydride) (PMVMA) under Argon. The TGA curve indicates that the PMVMA can have about 25 wt % char yield even after pyrolysis at 800° C. Pyrolysis may be full or partial. Carbonized polymers can serve as both a binder and a conductive additive and show less aggregation compared to conventional carbon conductive additives.

Figure 6:
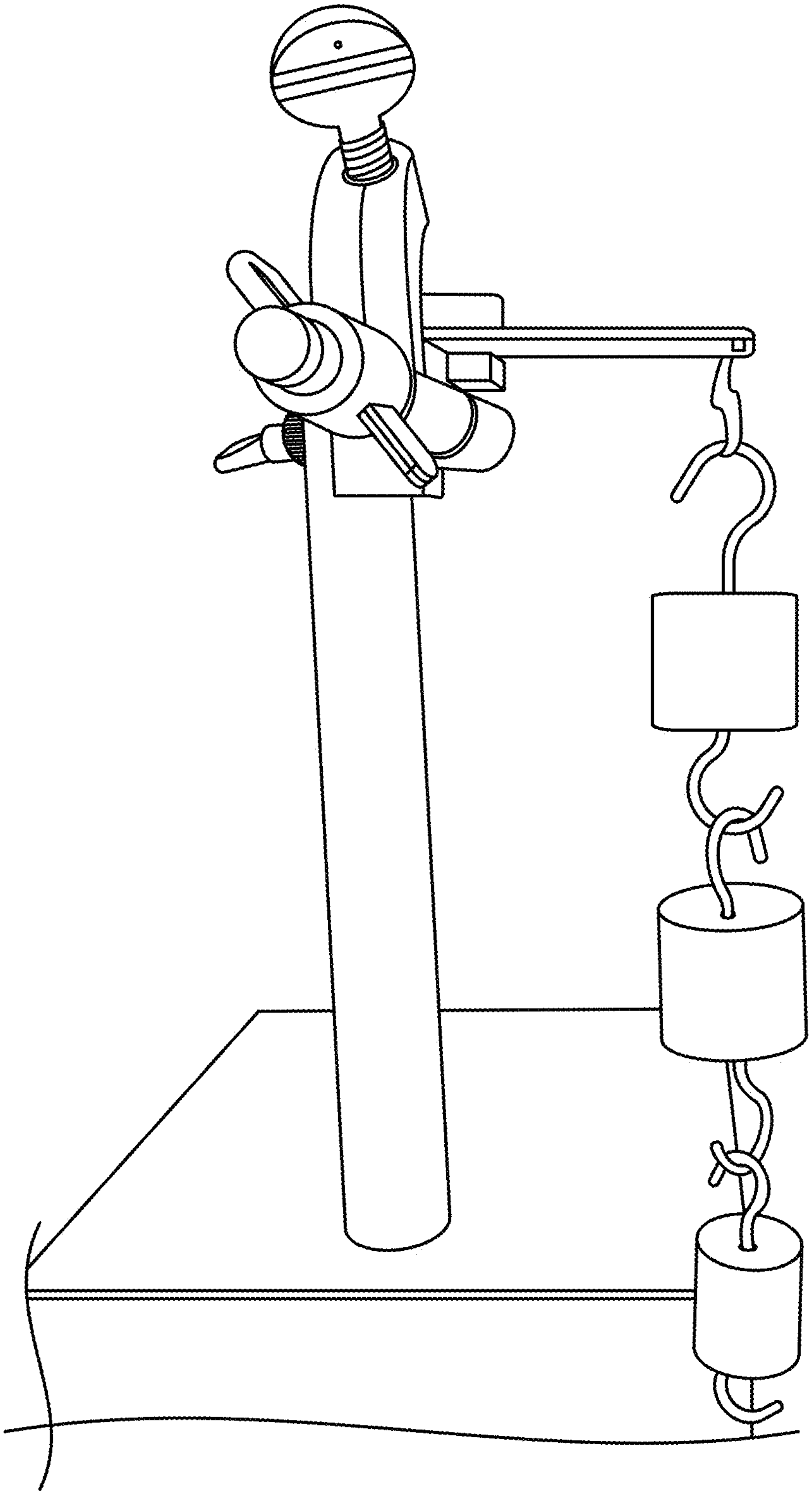
FIG. 6 shows an adhesion test for an anode pyrolyzed at 700° C. with PMVMA as binder, in accordance with an example embodiment of the disclosure.

In accordance with the disclosure, water-soluble maleic anhydride- and/or maleic acid-containing polymers serve as superior binders for anodes in making Si anodes. FIG. 6 shows an adhesion test for a Cu anode pyrolyzed at 700° C. utilizing PMVMA as binder. The anode shows a superior capability of holding >250 grams of weight before the coating detaches from the copper. In this test, the adhesive tape holding the anode on one side and the glass slide on the other may be a double-sided Scotch tape (½" Scotch@ Double Sided Tape Dispensered Rolls) with a width of 1.27 cm. Such adhesion is much higher than most binder-free anodes, which mostly fail to hold more than 50 grams of weight.

Figure 7:
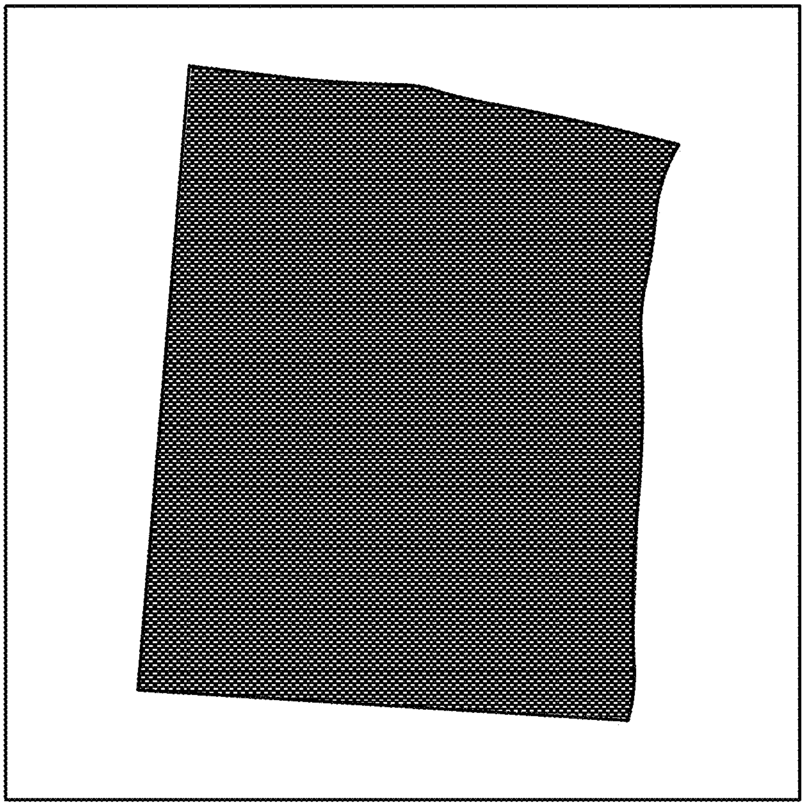
FIG. 7 is a photo showing the result of a winding test for a Si anode pyrolyzed at 700° C. with PMVMA as binder, in accordance with an example embodiment of the disclosure.

As discussed above, expansion of the silicon active material can result in poor cycle life due to cracking. For example, silicon can swell in excess of 300% upon lithium insertion. The use of water-soluble maleic anhydride- and/or maleic acid-containing polymers as binders as disclosed for Si anodes allows for free spaces to be created among Si particles during the pyrolysis process. These free spaces allow for the necessary expansion, creating the extra volume required for Si expansion during cycling. FIG. 7 is a photo showing the result of a winding test for a Si anode pyrolyzed at 700° C. with PMVMA as binder. In this test, the anode may be wrapped around a 4 mm mandrel in order to test the feasibility of using it for cylindrical cells. As it can be seen from the image in FIG. 7, the anode shows minor cracks, no copper exposure due to carbon detachment, and no flaking. Thus, in accordance with the disclosure, water-soluble maleic anhydride- and/or maleic acid-containing polymers serve as superior binders for anodes demonstrate remarkable flexibility and maintenance of anode integrity making them appropriate for use in cylindrical cells.

Figure 8A:
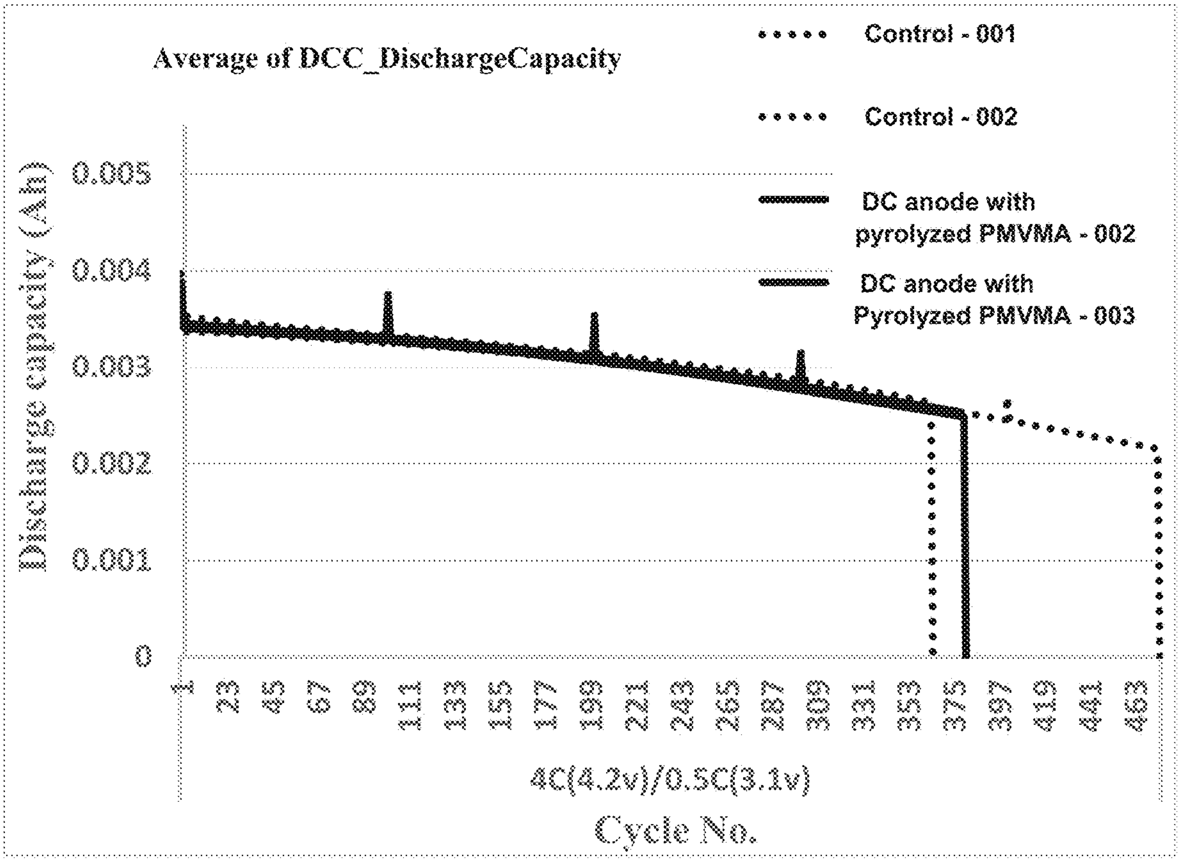
FIGS. 8A and 8B demonstrate Capacity retention (FIG. 8A) and Normalized capacity retention (FIG. 8B) of: (dotted line) standard Si anode/NCA cathode full cells—Control; and (solid line) as-fabricated Si anode/NCA cathode full cells using 20 wt % PMVMA aqueous solution followed by annealing at 550° C., in accordance with an example embodiment of the disclosure.
Figure 8B:
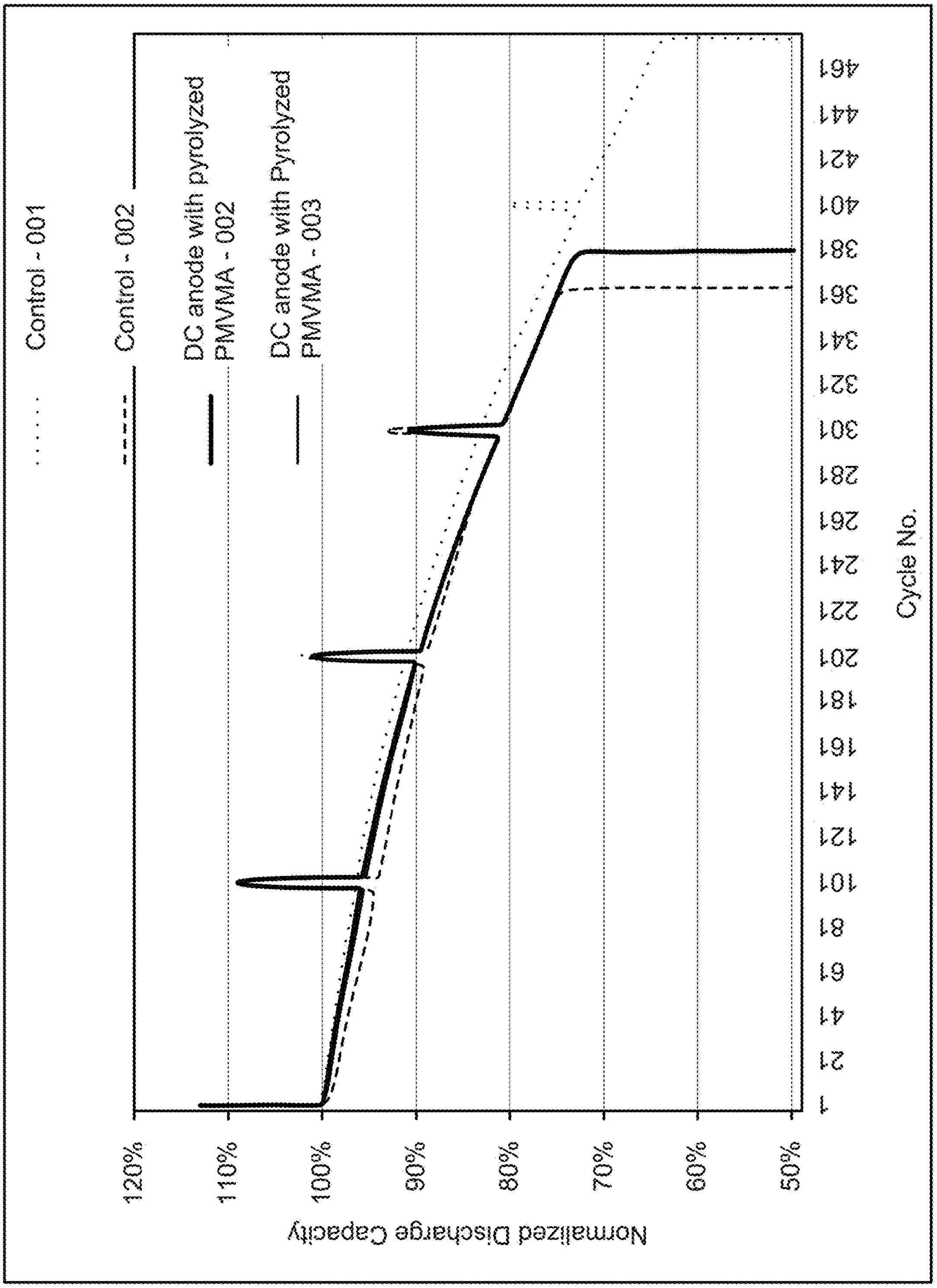

FIG. 8. Capacity retention (FIG. 8A) and Normalized capacity retention (FIG. 8B) curves of: (dotted line) standard Si anode/NCA cathode full cells—Control; and (solid line) as-fabricated Si anode/NCA cathode full cells. The standard Si anodes may contain about 80 wt % Si, 5 wt % graphite and 15 wt % glass carbon (from resin), and may be laminated on 15 μm Cu foil. The average loading is about 2-5 $mg/cm^2$. The Si anodes may be prepared by mixing Si powders with 20 wt % PMVMA aqueous solution, then the as-prepared Si slurry may be coated on the surface of 20 μm Cu foil followed by annealing (pyrolyzing) at 550° C. for 1 hour. The final Si anodes contain about 90 wt % Si, and 10 wt % pyrolyzed carbon (from PMVMA). The average loading may be about 2-6 $mg/cm^2$. The cathodes may contain about 92 wt % NCA, 4 wt % conductive carbon and 4 wt % PVDF, and may be coated on 15 μm Al foil. The average loading may be about 20-30 $mg/cm^2$. The electrolytes used may be 1.2M LiPF6 in FEC/EMC (3/7 wt %).

The long-term cycling program for these cells may include: (i) At the 1st cycle, Charge at 0.33 C to 4.2 V until 0.05 C, rest 5 minutes, discharge at 0.33 C to 3 V, rest 5 minutes; and (ii) from the 2nd cycle, Charge at 4 C to 4.2 V until 0.05 C, rest 5 minutes, discharge at 0.5 C to 3.1 V, rest 5 minutes. After every 100 cycles, the test conditions in the 1st cycle may be repeated.

FIG. 8 shows that the as-fabricated Si-dominant anode-based Li-ion full cells using water-soluble maleic anhydride- and/or maleic acid-containing polymers as binders as disclosed have similar capacity and capacity retention with the control. The manufacturing processes of the as-fabricated Si anodes having water-soluble maleic anhydride- and/or maleic acid-containing polymers as binders (with or without further additives) are relatively simple and low cost. In addition, for the fabrication of Si-dominant anodes, toxic solvents such as NMP are avoided, and the process is environmentally friendly. Control Si-dominant anodes having about 80-85 wt % Si were manufactured with an NMP-containing organic solvent using a standard manufacturing process which is complicated, expensive and eco-unfriendly.

Figure 9A:
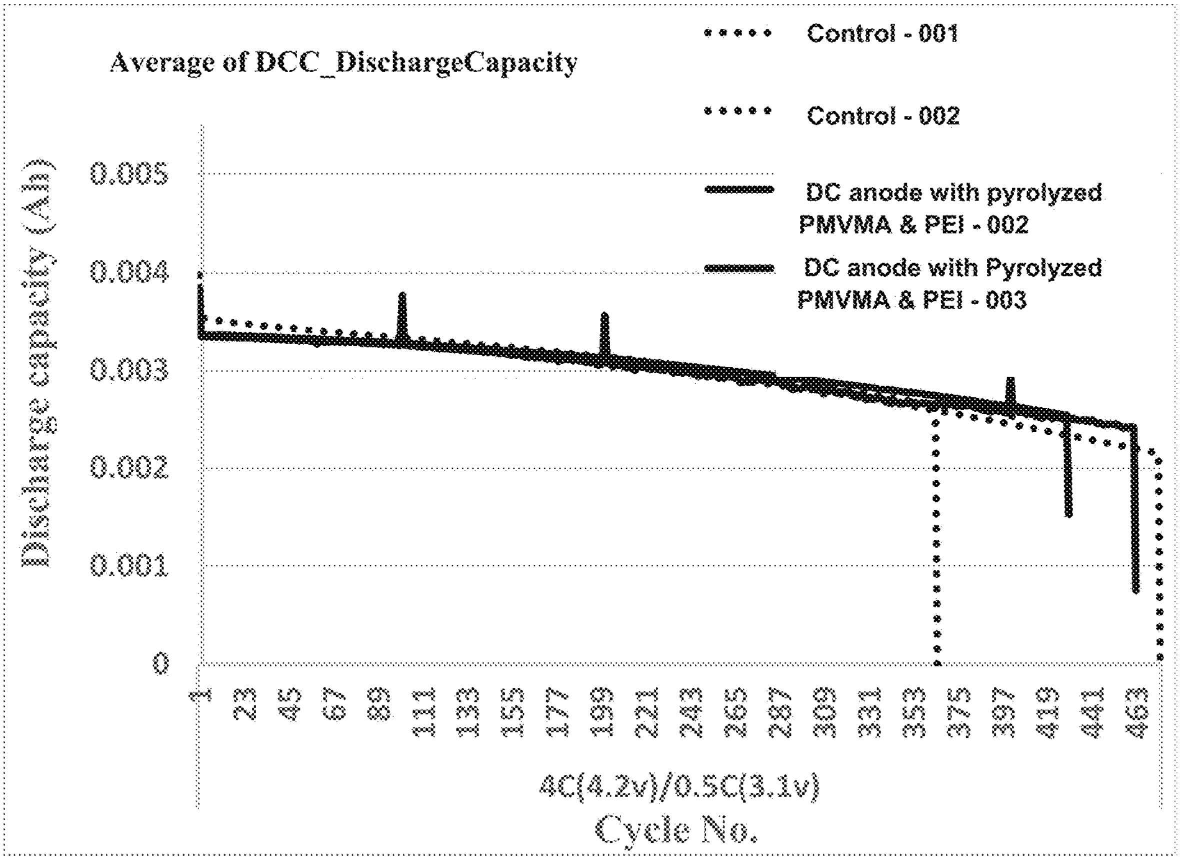
FIGS. 9A and 9B demonstrate Capacity retention (FIG. 9A) and Normalized capacity retention (FIG. 9B) of: (dotted line) standard Si anode/NCA cathode full cells—Control; and (solid line) as-fabricated Si anode/NCA cathode full cells using 20 wt % PMVMA aqueous solution with PEI, in accordance with an example embodiment of the disclosure.
Figure 9B:
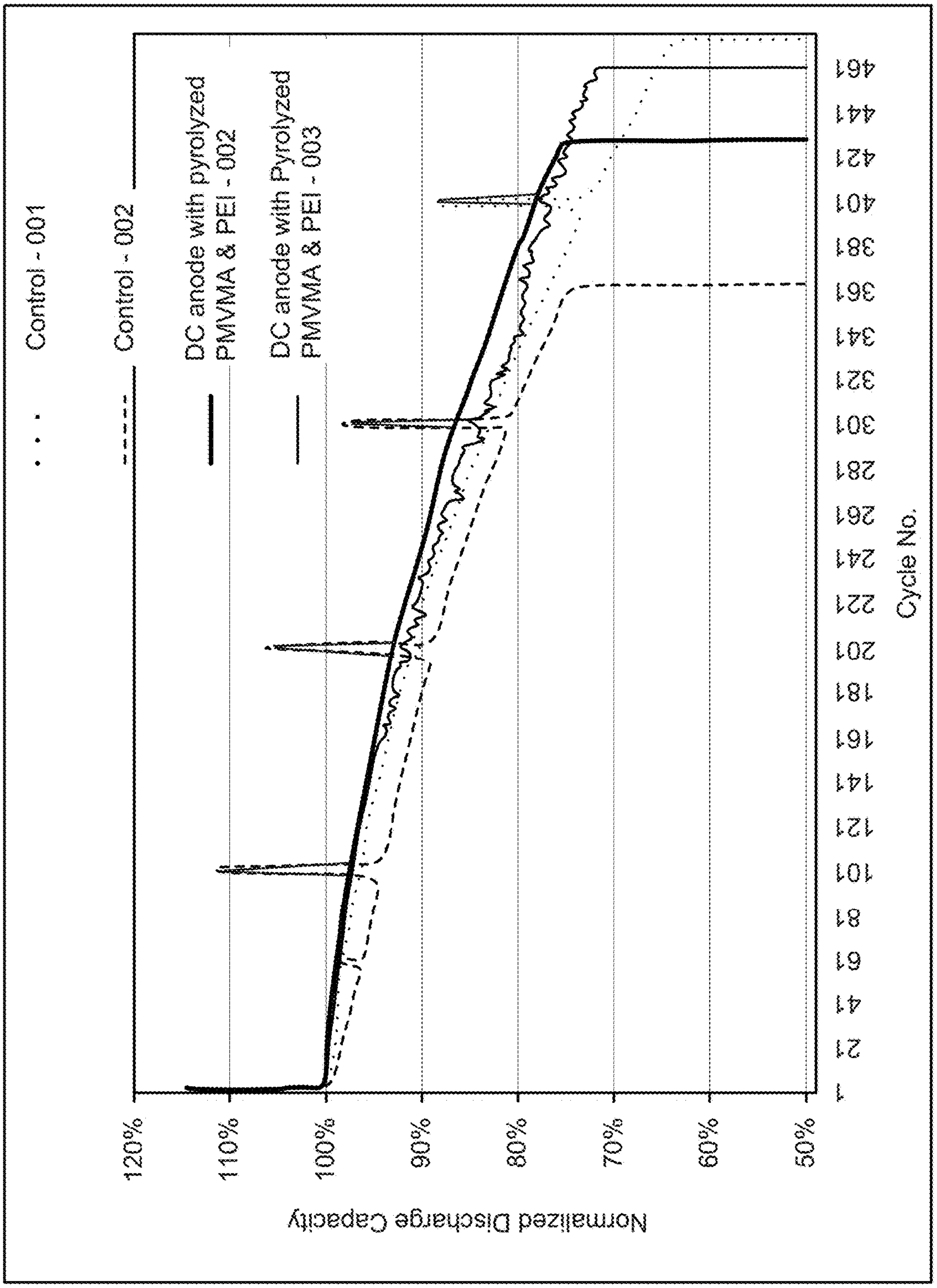

FIG. 9. Capacity retention (FIG. 9A) and Normalized capacity retention (FIG. 9B) curves of: (dotted line) the standard Si anode/NCA cathode full cells—Control; and (solid line) the as-fabricated Si anode/NCA cathode full cells. The standard Si anodes contain about 80 wt % Si, 5 wt % graphite and 15 wt % glass carbon (from resin), and may be laminated on 15 μm Cu foil. The average loading maybe about 2-5 $mg/cm^2$. The Si anodes may be prepared by mixing Si powders with 20 wt % PMVMA aqueous solution, then the as-prepared Si slurry may be coated on the surface of 20 μm Cu foil. After that, a very thin polyethylenimine (PEI) layer may be further coated followed by annealing (pyrolyzing) at 700° C. for 1 hour. The final Si anodes contain about 90 wt % Si, and 10 wt % pyrolyzed carbon (from PMVMA and the PEI coating layer). The average loading may be about 2-6 $mg/cm^2$. The cathodes contain about 92 wt % NCA, 4 wt % conductive carbon and 4 wt % PVDF, and may be coated on 15 μm Al foil. The average loading may be about 20-30 $mg/cm^2$. The electrolytes used may be 1.2M LiPF6 in FEC/EMC (3/7 wt %).

The long-term cycling program for these cells may be the same as shown in FIG. 8.

FIG. 9 shows that the as-fabricated Si-dominant anode-based Li-ion full cells using water-soluble maleic anhydride- and/or maleic acid-containing polymers as binders as disclosed have similar capacity and capacity retention with the control. As discussed above, the Si anodes using water-soluble maleic anhydride- and/or maleic acid-containing polymers as binders (with or without further additives) as disclosed herein are relatively inexpensive and are straightforward to make. The as-fabricated Si-dominant anodes are eco-friendly as they are made using aqueous solutions, thus avoiding toxic solvents. Control Si-dominant anodes having about 80-85 wt % Si were manufactured with an NMP-containing organic solvent using a standard manufacturing process which may be undesirable, for the reasons discussed above.

Figure 10A:
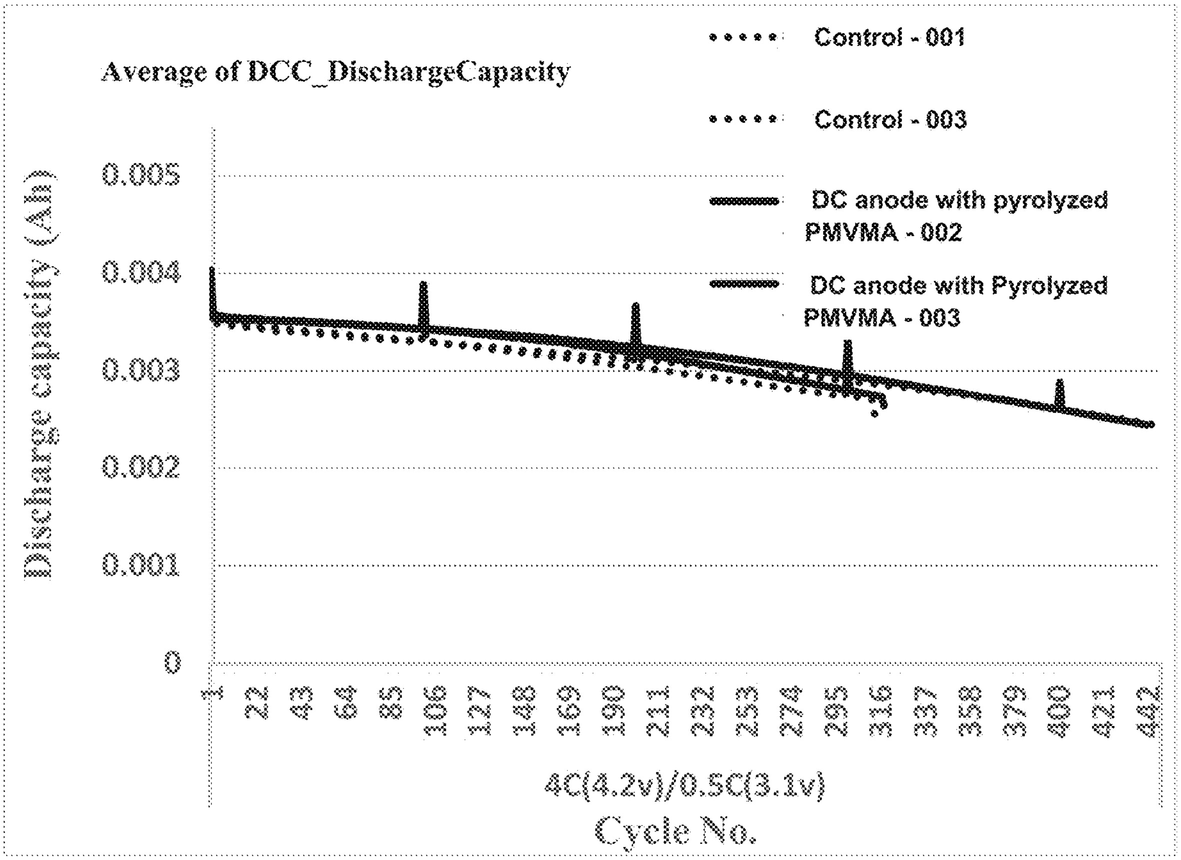
FIGS. 10A and 10B demonstrate Capacity retention (FIG. 9A) and Normalized capacity retention (FIG. 9B) of: (dotted line) standard Si anode/NCA cathode full cells—Control; and (solid line) as-fabricated Si anode/NCA cathode full cells using 20 wt % PMVMA aqueous solution followed by annealing at 700° C., in accordance with an example embodiment of the disclosure.
Figure 10B:
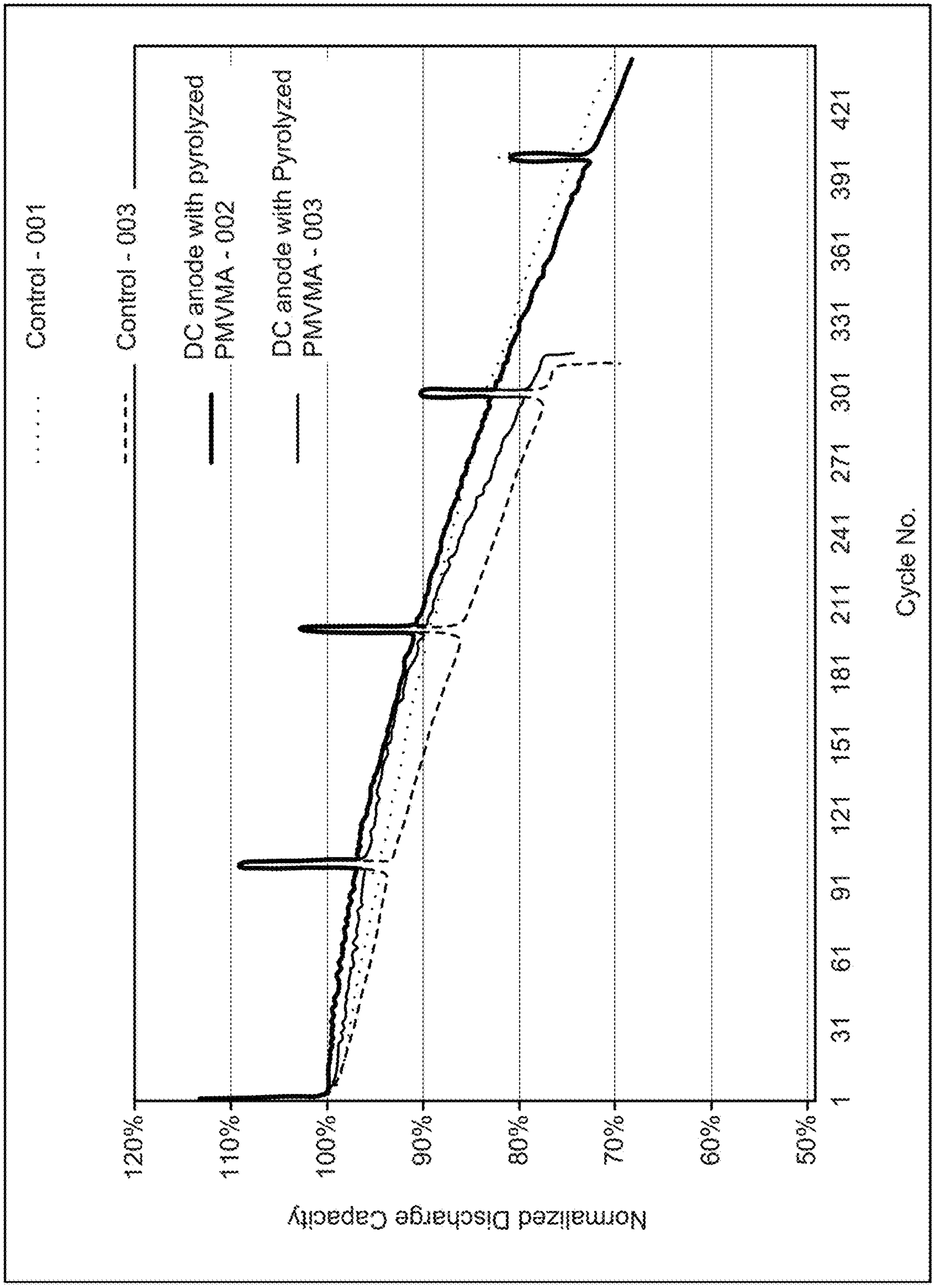

FIG. 10. Capacity retention (FIG. 10A) and Normalized capacity retention (FIG. 10B) curves of: (dotted line) the standard Si anode/NCA cathode full cells—Control; and (solid line) the as-fabricated Si anode/NCA cathode full cells. The standard Si anodes contain about 80 wt % Si, 5 wt % graphite and 15 wt % glass carbon (from resin), and may be laminated on 15 μm Cu foil. The average loading may be about 2-5 $mg/cm^2$. The as-fabricated Si anodes may be prepared by mixing Si powders with 20 wt % PMVMA aqueous solution, then the as-prepared Si slurry may be coated on the surface of 20 μm Cu foil followed by annealing (pyrolyzing) at 700° C. for 1 hour. The final Si anodes contain about 90 wt % Si, and 10 wt % pyrolyzed carbon (from PMVMA binder). The average loading may be about 2-6 $mg/cm^2$. The cathodes contain about 92 wt % NCA, 4 wt % conductive carbon and 4 wt % PVDF, and may be coated on 15 μm Al foil. The average loading may be about 20-30 $mg/cm^2$. The electrolytes used may be 1.2M $LiPF_6$ in FEC/EMC (3/7 wt %).

The long-term cycling program for these cells may be the same as shown in FIG. 8.

FIG. 10 shows that the as-fabricated Si-dominant anode-based Li-ion full cells using water-soluble maleic anhydride- and/or maleic acid-containing polymers as binders as disclosed have similar capacity and capacity retention with the control. As discussed above, the Si anodes using water-soluble maleic anhydride- and/or maleic acid-containing polymers as binders (with or without further additives) as disclosed herein are relatively inexpensive and are straightforward to make. The as-fabricated Si-dominant anodes are eco-friendly as they are made using aqueous solutions, thus avoiding toxic solvents. Control Si-dominant anodes having about 80-85 wt % Si were manufactured with an NMP-containing organic solvent using a standard manufacturing process which may be undesirable, for the reasons discussed above.

Figure 11A:
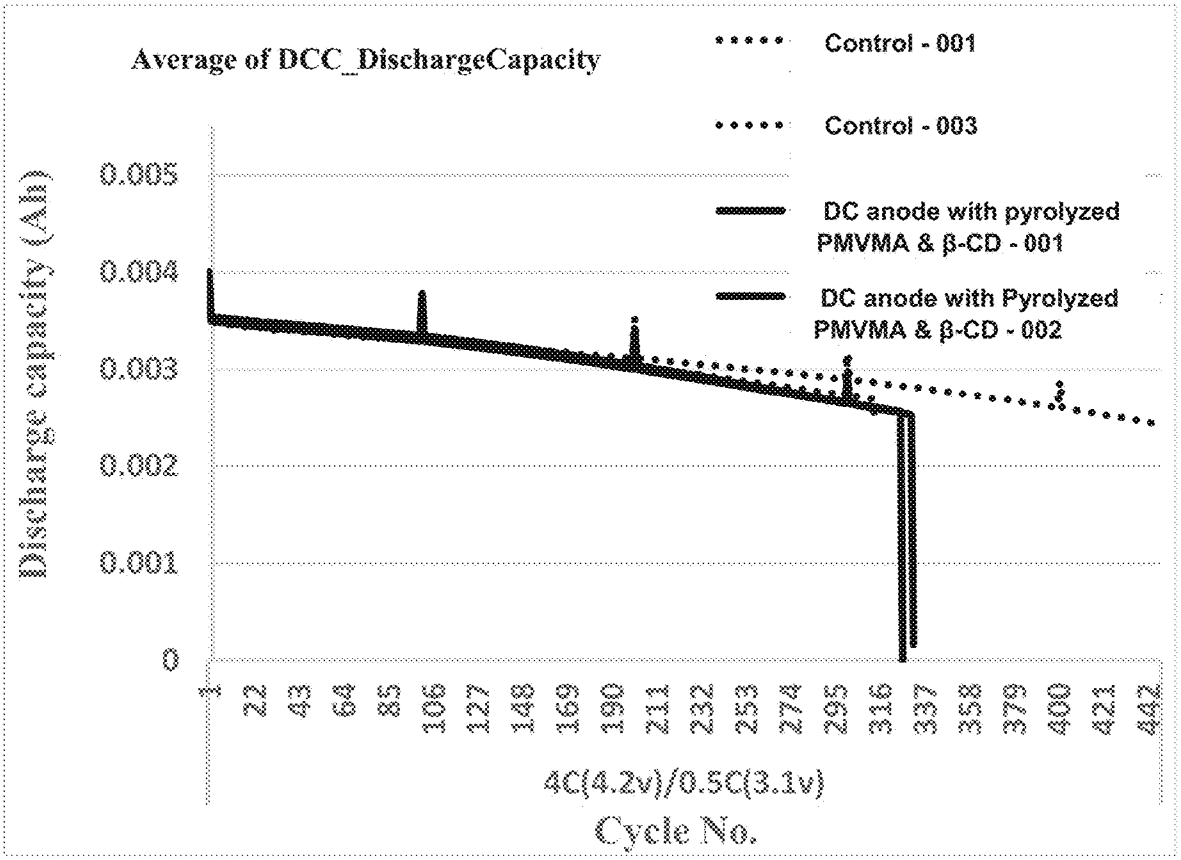
FIGS. 11A and 11B demonstrate Capacity retention (FIG. 11A) and Normalized capacity retention (FIG. 11B) of: (dotted line) standard Si anode/NCA cathode full cells—Control; and (solid line) as-fabricated Si anode/NCA cathode full cells using 20 wt % PMVMA aqueous solution with O-Cyclodextrin (0-CD), in accordance with an example embodiment of the disclosure.
Figure 11B:
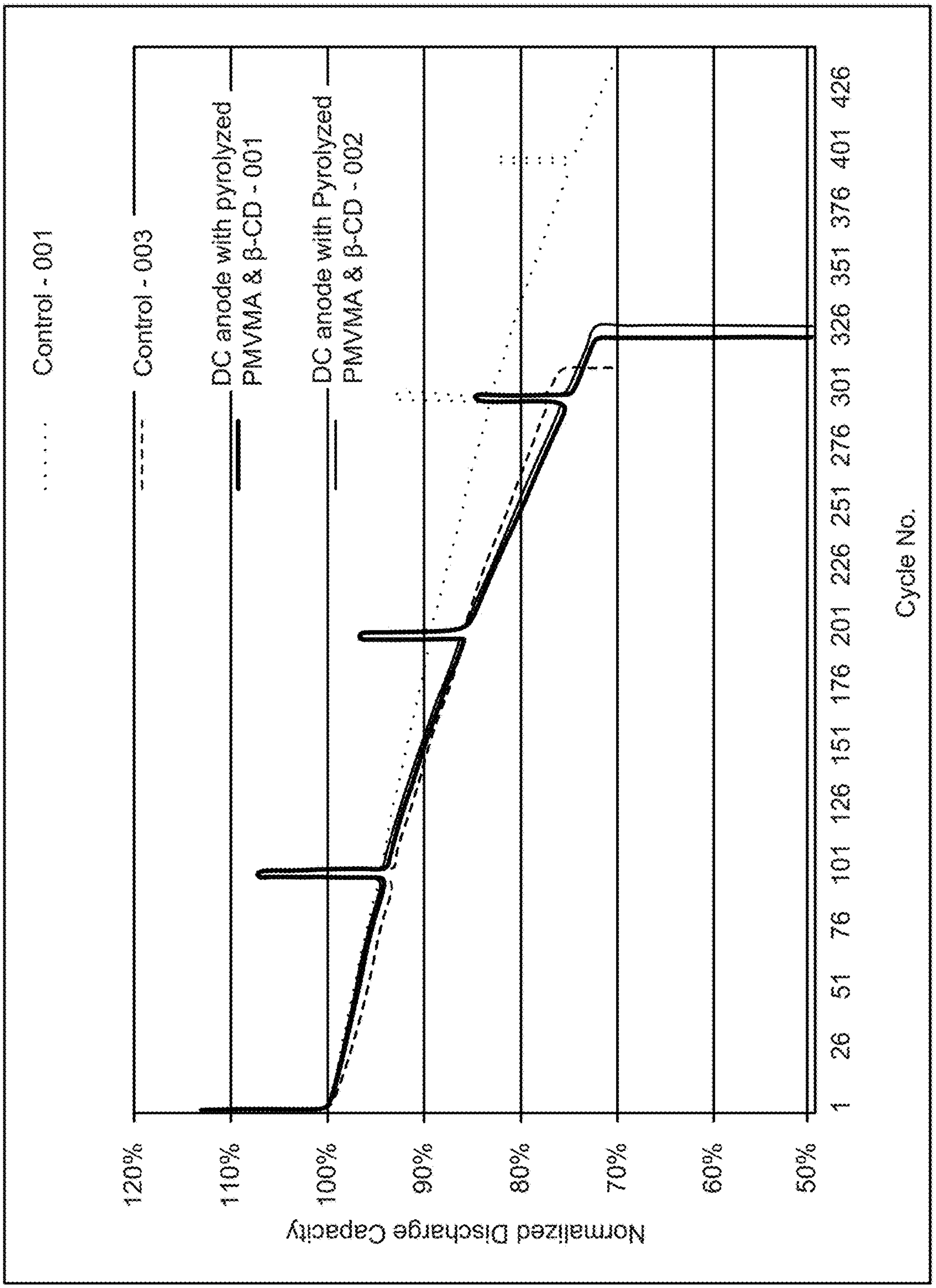

FIG. 11. Capacity retention (FIG. 11A) and Normalized capacity retention (FIG. 11B) curves of: (dotted line) the standard Si anode/NCA cathode full cells—Control; and (solid line) the as-fabricated Si anode/NCA cathode full cells. The standard Si anodes contain about 80 wt % Si, 5 wt % graphite and 15 wt % glass carbon (from resin), and may be laminated on 15 μm Cu foil. The average loading may be about 2-5 mg/cm$^2$. The as-fabricated Si anodes may be prepared by mixing Si powders with 20 wt % PMVMA & β-Cyclodextrin (β-CD) (9/1 wt %) aqueous solution, then the as-prepared Si slurry may be coated on the surface of 20 μm Cu foil followed by annealing at 700° C. for 1 hour. The final Si anodes contain about 90 wt % Si, and 10 wt % pyrolyzed carbon (from PMVMA & 3-CD (9/1 wt %) binders). The average loading may be about 2-6 mg/cm$^2$. The cathodes contain about 92 wt % NCA, 4 wt % conductive carbon and 4 wt % PVDF, and may be coated on 15 μm Al foil. The average loading may be about 20-30 mg/cm$^2$. The electrolytes used may be 1.2M $LiPF_6$ in FEC/EMC (3/7 wt %).

The long-term cycling program for these cells may be the same as shown in FIG. 8.

FIG. 11 shows that the as-fabricated Si-dominant anode-based Li-ion full cells using water-soluble maleic anhydride- and/or maleic acid-containing polymers as binders as disclosed have similar capacity and capacity retention with the control. As discussed above, the Si anodes using water-soluble maleic anhydride- and/or maleic acid-containing polymers as binders (with or without further additives) as disclosed herein are relatively inexpensive and are straightforward to make. The as-fabricated Si-dominant anodes are eco-friendly as they are made using aqueous solutions, thus avoiding toxic solvents. Control Si-dominant anodes having about 80-85 wt % Si were manufactured with an NMP-containing organic solvent using a standard manufacturing process which may be undesirable, for the reasons discussed above.

Figure 12A:
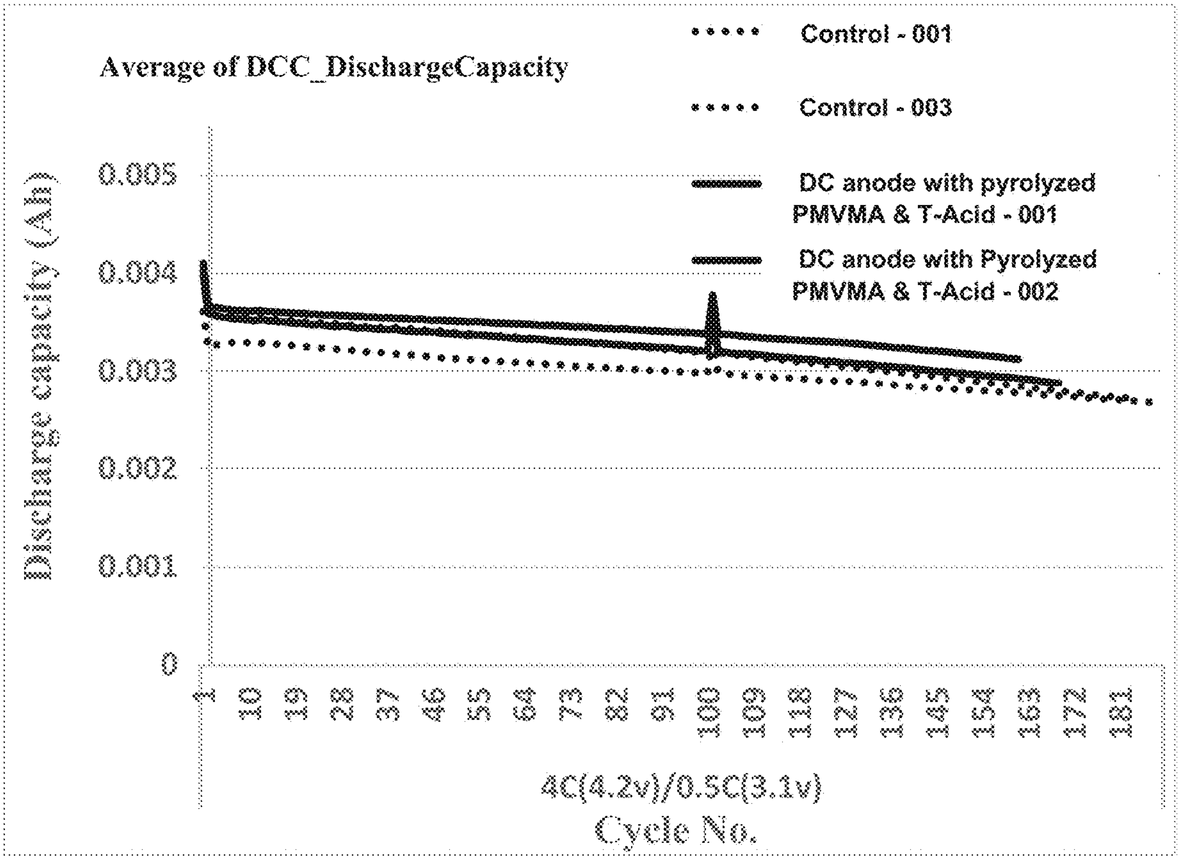
FIGS. 12A and 12B demonstrate Capacity retention (FIG. 12A) and Normalized capacity retention (FIG. 12B) of: (dotted line) standard Si anode/NCA cathode full cells—Control; and (solid line) as-fabricated Si anode/NCA cathode full cells using 20 wt % PMVMA aqueous solution with Tannic Acid, in accordance with an example embodiment of the disclosure.
Figure 12B:
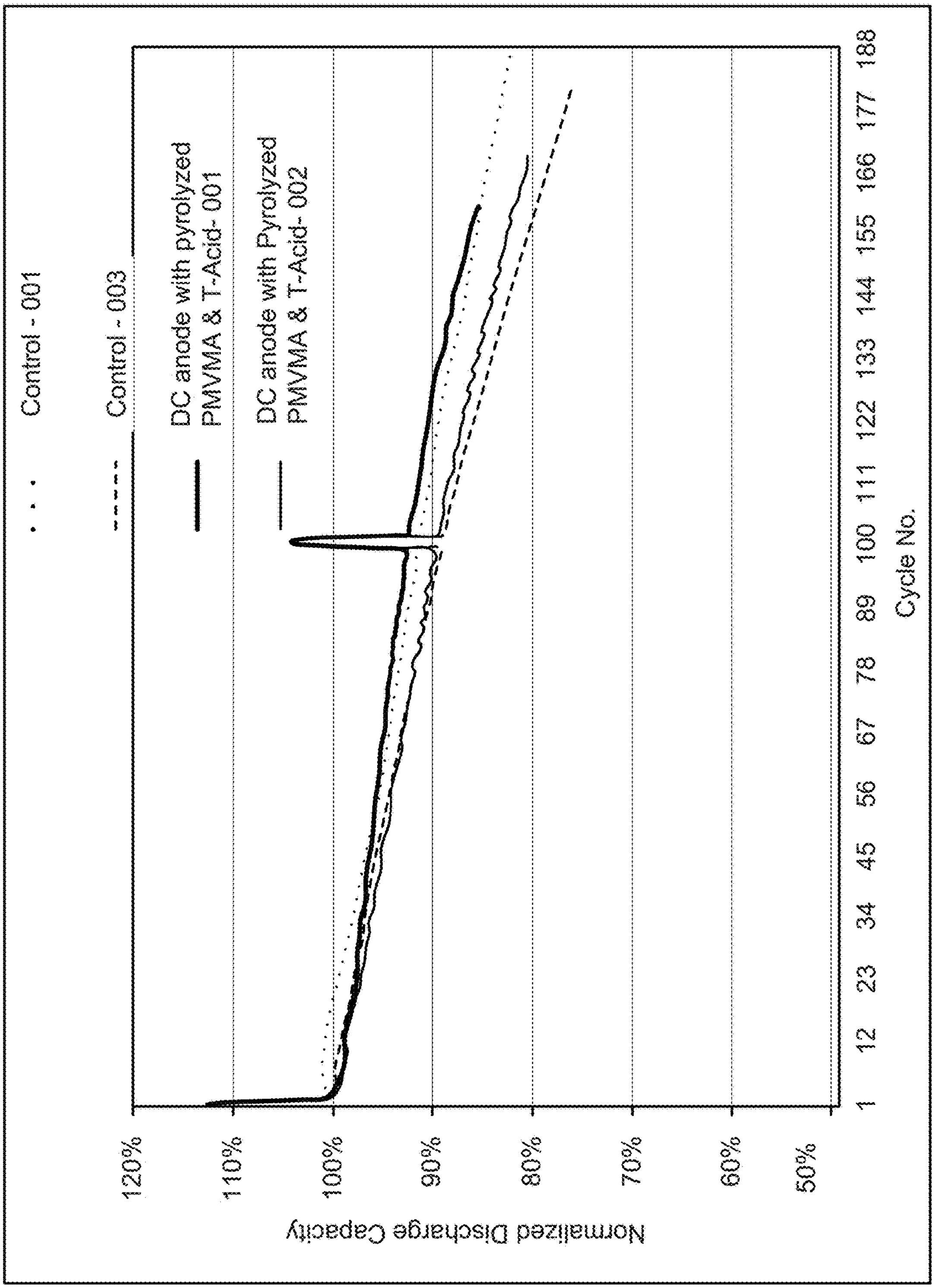

FIG. 12. Capacity retention (FIG. 12A) and Normalized capacity retention (FIG. 12B) curves of: (dotted line) the standard Si anode/NCA cathode full cells—Control; and (solid line) the as-fabricated Si anode/NCA cathode full cells. The standard Si anodes contain about 80 wt % Si, 5 wt % graphite and 15 wt % glass carbon (from resin), and may be laminated on 15 μm Cu foil. The average loading may be about 2-5 mg/cm$^2$. The as-fabricated Si anodes may be prepared by mixing Si powders with 20 wt % PMVMA & Tannic Acid (2/1 wt %) aqueous solution, then coating the as-prepared Si slurry on the surface of 20 μm Cu foil followed by annealing at 700° C. for 1 hour. The final Si anodes contain about 90 wt % Si, and 10 wt % pyrolyzed carbon (from PMVMA & Tannic Acid (2/1 wt %) binders). The average loading may be about 2-6 mg/cm$^2$. The cathodes contain about 92 wt % NCA, 4 wt % conductive carbon and 4 wt % PVDF, and may be coated on 15 μm Al foil. The average loading may be about 20-30 mg/cm$^2$. The electrolytes used may be 1.2M $LiPF_6$ in FEC/EMC (3/7 wt %).

The long-term cycling program for these cells may be the same as shown in FIG. 8.

FIG. 12 shows that the as-fabricated Si-dominant anode-based Li-ion full cells using water-soluble maleic anhydride- and/or maleic acid-containing polymers as binders as disclosed have similar capacity and capacity retention with the control. As discussed above, the Si anodes using water-soluble maleic anhydride- and/or maleic acid-containing polymers as binders (with or without further additives) as disclosed herein are relatively inexpensive and are straightforward to make. The as-fabricated Si-dominant anodes are eco-friendly as they are made using aqueous solutions, thus avoiding toxic solvents. Control Si-dominant anodes having about 80-85 wt % Si were manufactured with an NMP-containing organic solvent using a standard manufacturing process which may be undesirable, for the reasons discussed above.

Figure 13A:
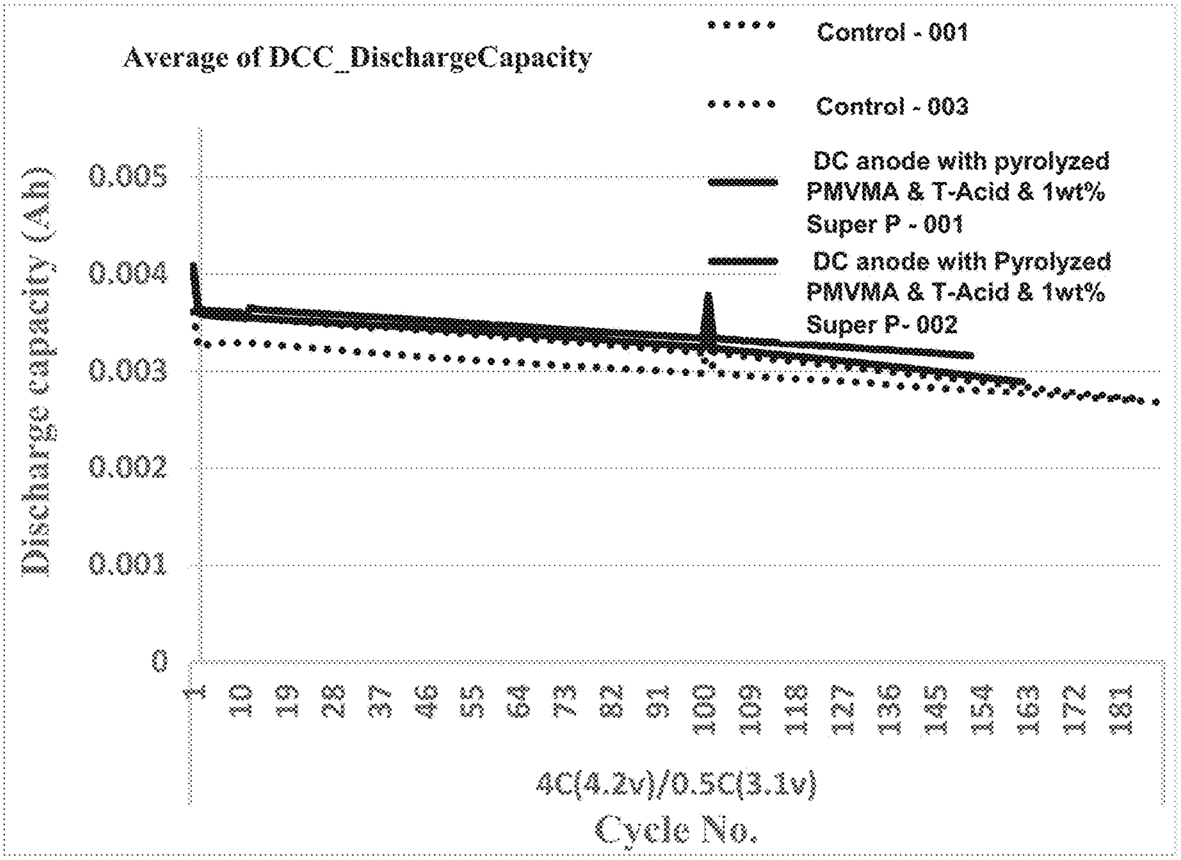
FIGS. 13A and 13B demonstrate Capacity retention (FIG. 13A) and Normalized capacity retention (FIG. 13B) of: (dotted line) standard Si anode/NCA cathode full cells—Control; and (solid line) as-fabricated Si anode/NCA cathode full cells using 20 wt % PMVMA aqueous solution with Tannic Acid and 1 wt % Super P followed by annealing at 700° C., in accordance with an example embodiment of the disclosure.
Figure 13B:
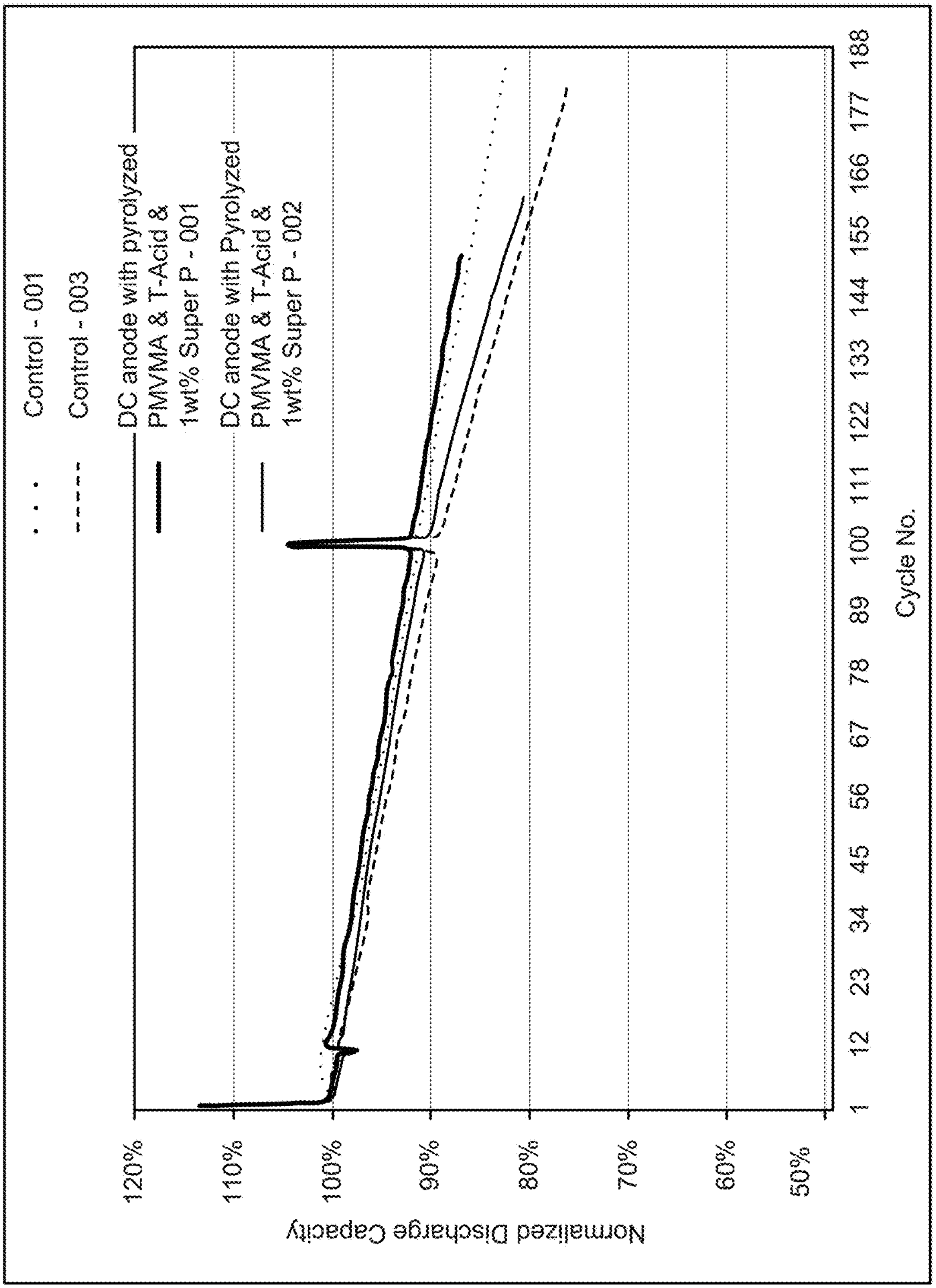

FIG. 13. Capacity retention (FIG. 13A) and Normalized capacity retention (FIG. 13B) curves of: (dotted line) the standard Si anode/NCA cathode full cells—Control; and (solid line) the as-fabricated Si anode/NCA cathode full cells. The standard Si anodes contain about 80 wt % Si, 5 wt % graphite and 15 wt % glass carbon (from resin), and may be laminated on 15 μm Cu foil. The average loading is about 2-5 mg/cm$^2$. The as-fabricated Si anodes may be prepared by mixing Si powders, 20 wt % PMVMA & Tannic Acid (2/1 wt %) aqueous solution, and 1 wt % Super P, then coating the as-prepared Si slurry on the surface of 20 μm Cu foil followed by annealing at 700° C. for 1 hour. The final Si anodes contain about 90 wt % Si, 1 wt % Super P, and 9 wt % pyrolyzed carbon (from PMVMA & Tannic Acid (2/1 wt %)). The average loading may be about 2-6 mg/cm$^2$. The cathodes contain about 92 wt % NCA, 4 wt % conductive carbon and 4 wt % PVDF, and may be coated on 15 μm Al foil. The average loading may be about 20-30 mg/cm$^2$. The electrolytes used may be 1.2M $LiPF_6$ in FEC/EMC (3/7 wt %).

The long-term cycling program for these cells may be the same as shown in FIG. 8.

FIG. 13 shows that the as-fabricated Si-dominant anode-based Li-ion full cells using water-soluble maleic anhydride- and/or maleic acid-containing polymers as binders as disclosed have similar capacity and capacity retention with the control. As discussed above, the Si anodes using water-soluble maleic anhydride- and/or maleic acid-containing polymers as binders (with or without further additives) as disclosed herein are relatively inexpensive and are straightforward to make. The as-fabricated Si-dominant anodes are eco-friendly as they are made using aqueous solutions, thus avoiding toxic solvents. Control Si-dominant anodes having about 80-85 wt % Si were manufactured with an NMP-containing organic solvent using a standard manufacturing process which may be undesirable, for the reasons discussed above.

Figure 14A:
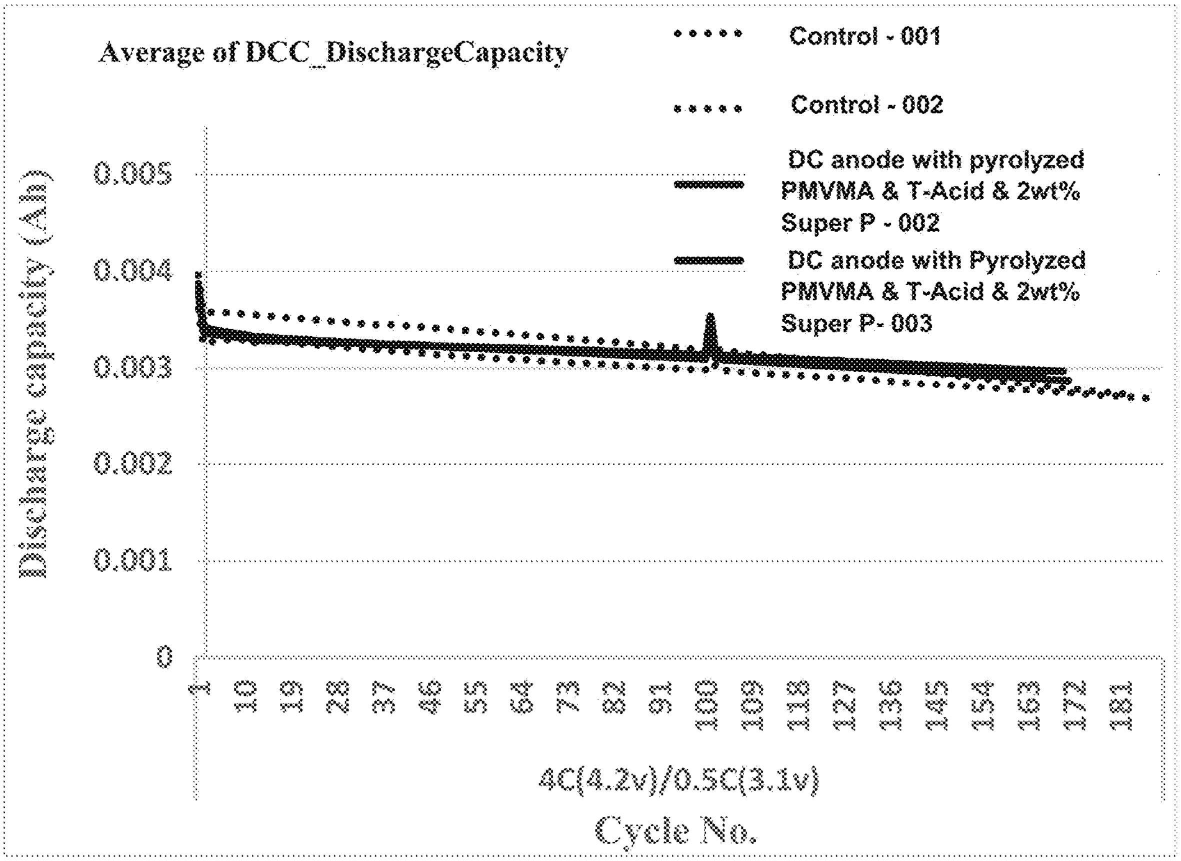
FIGS. 14A and 14B demonstrate Capacity retention (FIG. 14A) and Normalized capacity retention (FIG. 14B) of: (dotted line) standard Si anode/NCA cathode full cells—Control; and (solid line) as-fabricated Si anode/NCA cathode full cells using 20 wt % PMVMA aqueous solution with Tannic Acid and 2 wt % Super P followed by annealing at 550° C., in accordance with an example embodiment of the disclosure.
Figure 14B:
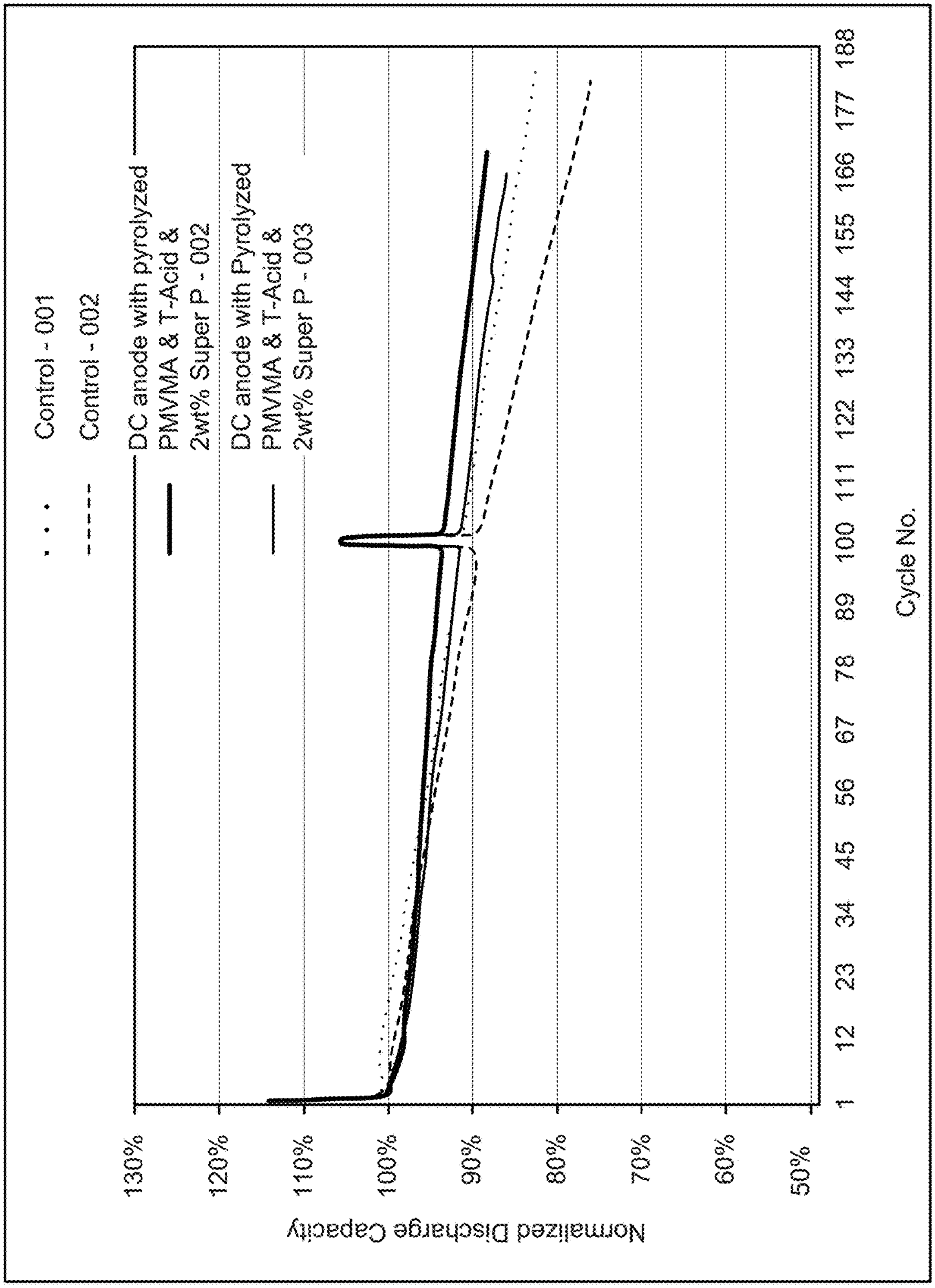

FIG. 14. Capacity retention (FIG. 14A) and Normalized capacity retention (FIG. 14B) curves of: (dotted line) the standard Si anode/NCA cathode full cells—Control; and (solid line) the as-fabricated Si anode/NCA cathode full cells. The standard Si anodes contain about 80 wt % Si, 5 wt % graphite and 15 wt % glass carbon (from resin), and may be laminated on 15 μm Cu foil. The average loading may be about 2-5 mg/cm$^2$. The as-fabricated Si anodes may be prepared by mixing Si powders, 20 wt % PMVMA & Tannic Acid (2/1 wt %) aqueous solution, and 2 wt % Super P, then coating the as-prepared Si slurry on the surface of 20 μm Cu foil followed by annealing at 550° C. for 1 hour. The final Si anodes contain about 90 wt % Si, 2 wt % Super P, and 8 wt % pyrolyzed carbon (from PMVMA & Tannic Acid (2/1 wt %) binders). The average loading may be about 2-6 mg/cm$^2$. The cathodes contain about 92 wt % NCA, 4 wt % conductive carbon and 4 wt % PVDF, and may be coated on 15 μm Al foil. The average loading may be about 20-30 mg/cm$^2$. The electrolytes used may be 1.2M $LiPF_6$ in FEC/EMC (3/7 wt %).

The long-term cycling program for these cells may be the same as shown in FIG. 8.

FIG. 14 shows that the as-fabricated Si-dominant anode-based Li-ion full cells using water-soluble maleic anhydride- and/or maleic acid-containing polymers as binders as disclosed have similar capacity and capacity retention with the control. As discussed above, the Si anodes using water-soluble maleic anhydride- and/or maleic acid-containing polymers as binders (with or without further additives) as disclosed herein are relatively inexpensive and are straightforward to make. The as-fabricated Si-dominant anodes are eco-friendly as they are made using aqueous solutions, thus avoiding toxic solvents. Control Si-dominant anodes having about 80-85 wt % Si were manufactured with an NMP-containing organic solvent using a standard manufacturing process which may be undesirable, for the reasons discussed above.

Figure 15A:
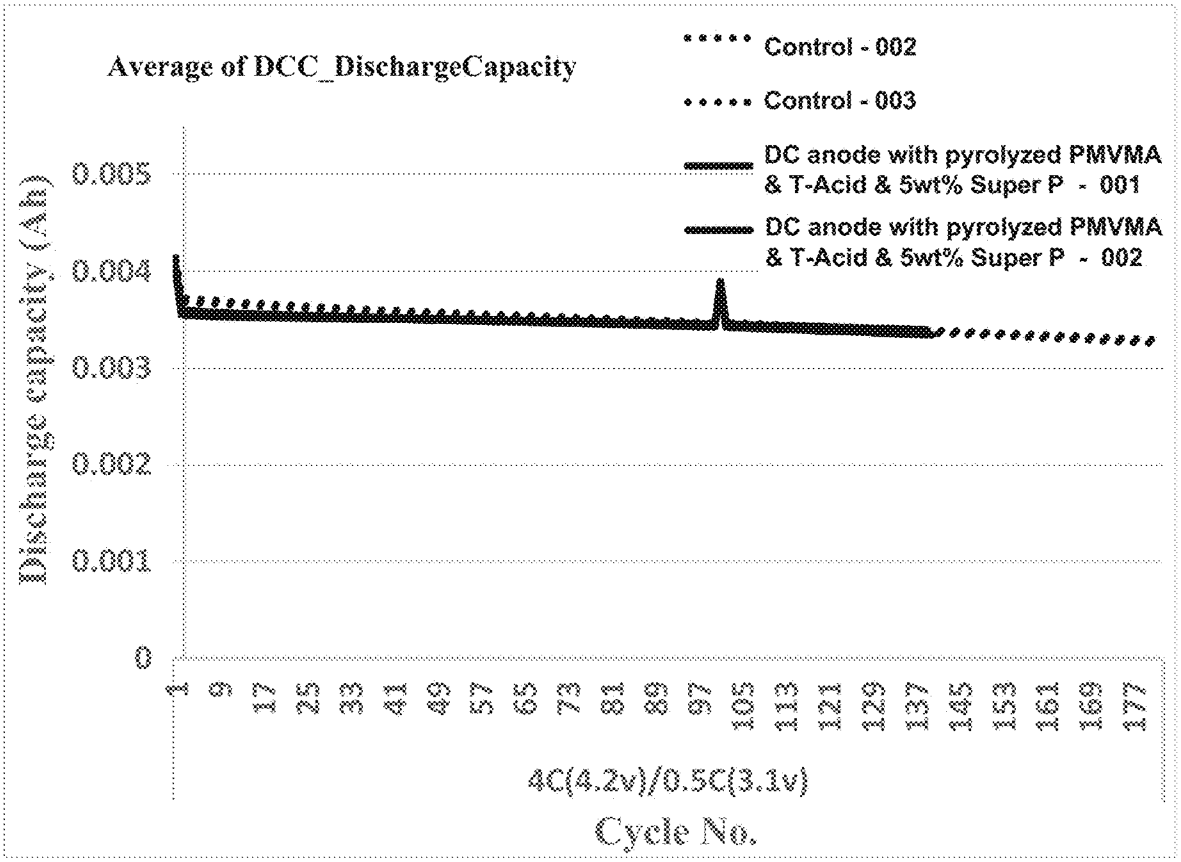
FIGS. 15A and 15B demonstrate Capacity retention (FIG. 15A) and Normalized capacity retention (FIG. 15B) of: (dotted line) standard Si anode/NCA cathode full cells—Control; and (solid line) as-fabricated Si anode/NCA cathode full cells using 20 wt % PMVMA aqueous solution with Tannic Acid and 5 wt % Super P followed by annealing at 550° C., in accordance with an example embodiment of the disclosure.
Figure 15B:
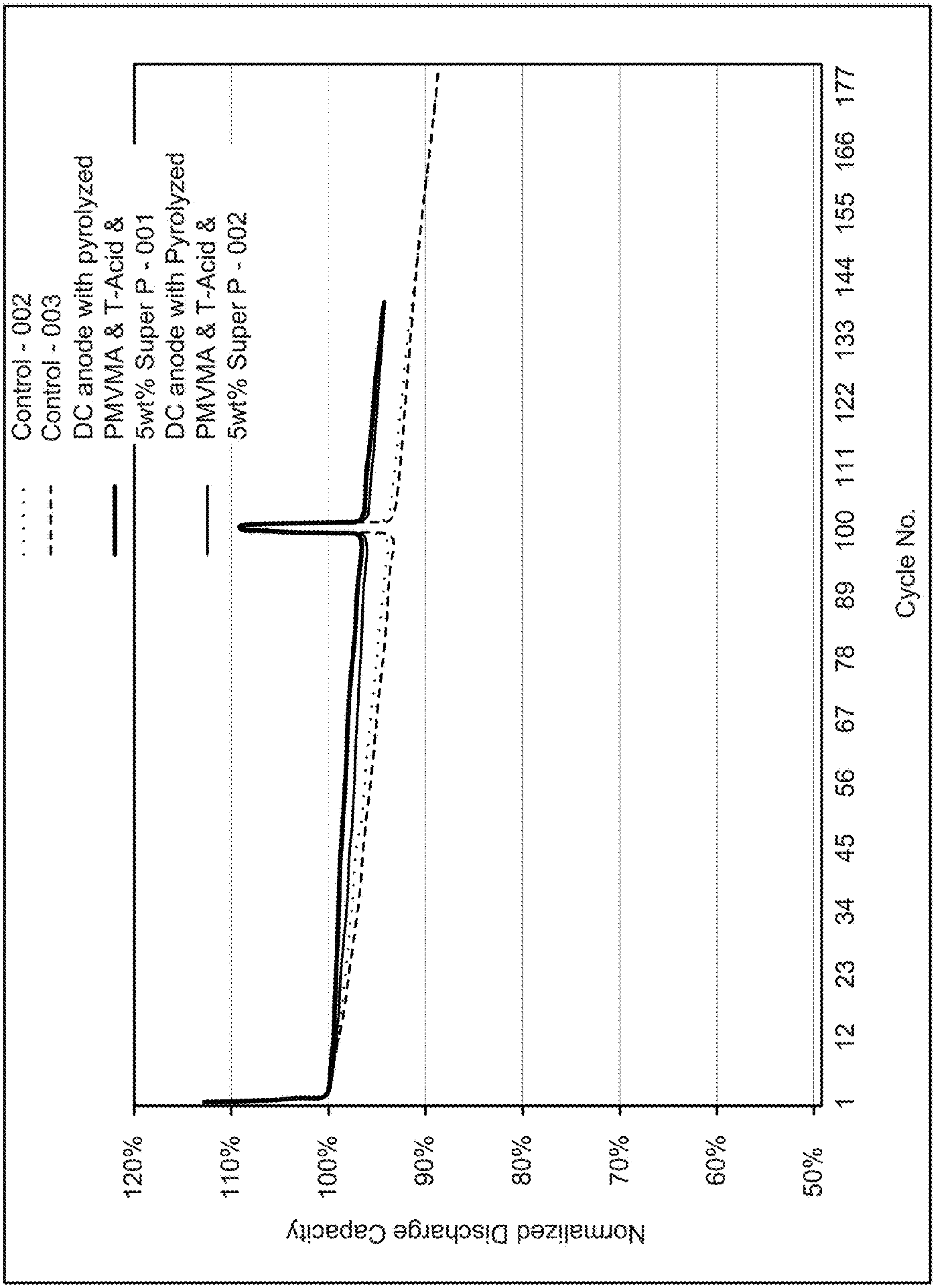

FIG. 15. Capacity retention (FIG. 15A) and Normalized capacity retention (FIG. 15B) curves of: (dotted line) the standard Si anode/NCA cathode full cells—Control; and (solid line) the as-fabricated Si anode/NCA cathode full cells. The standard Si anodes contain about 80 wt % Si, 5 wt % graphite and 15 wt % glass carbon (from resin), and may be laminated on 15 μm Cu foil. The average loading may be about 2-5 mg/cm$^2$. The as-fabricated Si anodes may be prepared by mixing Si powders, 20 wt % PMVMA & Tannic Acid (2/1 wt %) aqueous solution, and 5 wt % Super P, then coating the as-prepared Si slurry on the surface of 20 μm Cu foil followed by annealing at 550° C. for 1 hour. The final Si anodes contain about 90 wt % Si, 5 wt % Super P, and 5 wt % pyrolyzed carbon (from PMVMA & Tannic Acid (2/1 wt %) binders). The average loading may be about 2-6 mg/cm$^2$. The cathodes contain about 92 wt % NCA, 4 wt % conductive carbon and 4 wt % PVDF, and may be coated on 15 μm Al foil. The average loading may be about 20-30 mg/cm$^2$. The electrolytes used may be 1.2M $LiPF_6$ in FEC/EMC (3/7 wt %).

The long-term cycling program for these cells may be the same as shown in FIG. 8.

FIG. 15 shows that the as-fabricated Si-dominant anode-based Li-ion full cells using water-soluble maleic anhydride- and/or maleic acid-containing polymers as binders as disclosed have similar capacity and capacity retention with the control. As discussed above, the Si anodes using water-soluble maleic anhydride- and/or maleic acid-containing polymers as binders (with or without further additives) as disclosed herein are relatively inexpensive and are straightforward to make. The as-fabricated Si-dominant anodes are eco-friendly as they are made using aqueous solutions, thus avoiding toxic solvents. Control Si-dominant anodes having about 80-85 wt % Si were manufactured with an NMP-containing organic solvent using a standard manufacturing process which may be undesirable, for the reasons discussed above.

Thus, as disclosed herein, using water-soluble maleic anhydride- and/or maleic acid-containing polymers/co-polymers, derivatives, and/or combinations (with or without additives) as binders for Si-dominant anodes may have the following one or more advantages: (i) Environmentally friendly; (2) Low cost; (3) Easier and/or faster processing; (4) Improved manufacturing ability; (5) Better quality; (6) Flexibility of formulation design; and/or (7) Satisfactory carbon yield after pyrolysis.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "Example" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery electrode, the electrode comprising an electrode coating layer comprising from about 1 wt % to 95 wt % Si;

wherein said electrode coating layer further comprises a water-soluble maleic anhydride- or maleic acid-containing polymer binder; and wherein said polymer binder comprises Poly(methyl vinyl ether-alt-maleic anhydride); Poly(methyl vinyl ether-alt-maleic acid); Poly(styrene-alt-maleic acid) sodium salts; Poly(styrene-co-maleic acid), partial isobutyl esters; Poly(styrene-co-maleic acid), partial isobutyl/methyl mixed esters; Poly(styrene-alt-maleic anhydride), partial methyl esters; Poly(isobutylene-alt-maleic anhydride); Poly(maleic anhydride-alt-1-octadecene); Poly(ethylene-alt-maleic anhydride); Polypropylene-graft-maleic anhydride; Polyisoprene-graft-maleic anhydride; or Polystyrene-block-poly(ethylene-ran-butylene)-block-polystyrene-graft-maleic anhydride; and wherein said polymer binder further comprises a conductive additive, wherein said conductive additive comprises Super P carbon black, graphite, graphene, carbon nanofibers, carbon fibers, carbon nanotubes, porous carbons and/or other types of zero-, one-, two-, or three-dimensional carbon materials.

2. The electrode according to claim 1, wherein said polymer binder comprises a lithium salt of a maleic anhydride- or maleic acid-containing polymer.

3. The electrode according to claim 1, wherein said polymer binder further comprises a functional compound additive, wherein said functional compound additive comprises Poly(acrylic acid), Poly(vinyl alcohol), Lignin, styrene-butadiene rubber, Gelatin, Carboxymethyl cellulose, Chitosan, Alginate, Pectin, Amylose, Starch, Xanthan gum, Arabic gum, Gelan gum, Karaya gum, and/or Guar gum.

4. The electrode according to claim 1, wherein said polymer binder further comprises a functional compound additive, wherein said functional compound additive comprises Putrescine, Spermidine, Spermine, Thermospermine, Polyethylenimine, N,N'-Methylenebisacrylamide, N,N'-Ethylenebisacrylamide, Poly(ethylene glycol) diglycidyl ether, Trimethylolpropane triglycidyl ether, Tris(4-hydroxyphenyl) methane triglycidyl ether, Tris(2,3-epoxypropyl) isocyanurate, Poly[(o-cresyl glycidyl ether)-co-formaldehyde], Trimethylolpropane tris(3-mercaptopropionate), Pentaerythritol tetrakis(3-mercaptopropionate), 2,2'-(Ethylenedioxy) diethanethiol, 1,2-Ethanedithiol, or 1,4-Butanedithiol.

5. The electrode according to claim 1, wherein the electrode coating layer comprises more than 70% silicon.

6. The electrode according to claim 1, wherein the battery electrode is in a lithium ion battery.

7. The electrode according to claim 1, wherein the electrode coating layer is pyrolyzed.

8. A method of forming a battery electrode, the method comprising:

creating an electrode coating layer from an electrode slurry comprising an aqueous solution of a maleic anhydride- or maleic acid-containing polymer binder and about 1 wt % to 95 wt % Si powder, with optional additives;

fabricating a battery electrode by coating the slurry on a current collector; and pyrolyzing said electrode coating layer;

wherein said polymer binder comprises Poly(methyl vinyl ether-alt-maleic anhydride); Poly(methyl vinyl ether-alt-maleic acid); Poly(styrene-alt-maleic acid) sodium salts; Poly(styrene-co-maleic acid), partial isobutyl esters; Poly(styrene-co-maleic acid), partial isobutyl/methyl mixed esters; Poly(styrene-alt-maleic anhydride), partial methyl esters; Poly(isobutylene-alt-maleic anhydride); Poly(maleic anhydride-alt-1-octadecene); Poly(ethylene-alt-maleic anhydride); Polypropylene-graft-maleic anhydride; Polyisoprene-graft-maleic anhydride; or Polystyrene-block-poly(ethylene-ran-butylene)-block-polystyrene-graft-maleic anhydride; and wherein said polymer binder further comprises a conductive additive, wherein said conductive additive comprises Super P carbon black, graphite, graphene, carbon nanofibers, carbon fibers, carbon nanotubes, porous carbons and/or other types of zero-, one-, two-, or three-dimensional carbon materials.

9. The method according to claim 8, wherein said polymer binder comprises a lithium salt of a maleic anhydride- or maleic acid-containing polymer.

10. The method according to claim 8, wherein said polymer binder further comprises a functional compound additive, wherein said functional compound additive comprises Poly(acrylic acid), Poly(vinyl alcohol), Lignin, styrene-butadiene rubber, Gelatin, Carboxymethyl cellulose, Chitosan, Alginate, Pectin, Amylose, Starch, Xanthan gum, Arabic gum, Gelan gum, Karaya gum, and/or Guar gum.

11. The method according to claim 8, wherein said polymer binder further comprises a functional compound additive, wherein said functional compound additive comprises Putrescine, Spermidine, Spermine, Thermospermine, Polyethylenimine, N,N'-Methylenebisacrylamide, N,N'-Ethylenebisacrylamide, Poly(ethylene glycol) diglycidyl ether, Trimethylolpropane triglycidyl ether, Tris(4-hydroxyphenyl) methane triglycidyl ether, Tris(2,3-epoxypropyl) isocyanurate, Poly[(o-cresyl glycidyl ether)-co-formaldehyde], Trimethylolpropane tris(3-mercaptopropionate), Pentaerythritol tetrakis(3-mercaptopropionate), 2,2'-(Ethylenedioxy) diethanethiol, 1,2-Ethanedithiol, or 1,4-Butanedithiol.

12. The method according to claim 8, wherein the electrode coating layer comprises more than 70% silicon.

13. The method according to claim 8, wherein the battery electrode is in a lithium ion battery.

* * * * *